United States Patent
Asano et al.

[11] Patent Number: 5,978,875
[45] Date of Patent: Nov. 2, 1999

[54] APPARATUS AND METHOD FOR SCHEDULING USE OF BUS

[75] Inventors: Shigehiro Asano; Masaki Suzuki, both of Kanagawa-ken, Japan

[73] Assignee: Kabushiki Kaisha Toshiba, Kawasaki, Japan

[21] Appl. No.: 08/818,868

[22] Filed: Mar. 17, 1997

[30] Foreign Application Priority Data

Mar. 18, 1996 [JP] Japan .................................. 8-061467

[51] Int. Cl.$^6$ .................................................. G06F 13/00
[52] U.S. Cl. ......................... 710/107; 710/113; 709/200; 712/23
[58] Field of Search ............... 395/287, 200.2, 395/427, 293, 725, 425; 370/85.6; 364/200; 710/107

[56] References Cited

U.S. PATENT DOCUMENTS

| | | |
|---|---|---|
| 4,517,670 | 5/1985 | Ulug ........................................ 370/463 |
| 4,688,168 | 8/1987 | Gudaitis et al. ........................ 364/200 |
| 5,193,193 | 3/1993 | Iyer ........................................ 395/725 |
| 5,297,292 | 3/1994 | Morimoto et al. ...................... 395/725 |
| 5,307,471 | 4/1994 | Ishikawa ................................ 395/425 |
| 5,463,624 | 10/1995 | Hogg et al. ........................... 370/85.6 |
| 5,528,767 | 6/1996 | Chen ...................................... 395/293 |
| 5,623,622 | 4/1997 | Yuki et al. ............................. 395/427 |
| 5,655,133 | 8/1997 | Dupree et al. .......................... 712/23 |
| 5,717,854 | 2/1998 | Egawa et al. ......................... 395/200.2 |

*Primary Examiner*—Ayaz R. Sheikh
*Assistant Examiner*—Eric S. Thlang
*Attorney, Agent, or Firm*—Finnegan, Henderson, Farabow, Garrett & Dunner, L.L.P.

[57] ABSTRACT

A continuous data server includes a storage unit connected to a buffer memory which is in turn connected to a plurality of communication control units which transfer data of the buffer memory to a network. The right to use a bus interconnecting the buffer memory and communication control units is deterministically assigned by a micro-scheduler in accordance with a program stored in a micro-schedule table. The micro-scheduler allocates the right to use the bus in accordance with a predetermined schedule, rather than by arbitration.

27 Claims, 17 Drawing Sheets

FIG. 6(a)

| COMMAND | SOURCE ADDRESS | DESTINATION ADDRESS |
|---|---|---|

FIG. 6(b)

| COMMAND | SOURCE ADDRESS | DESTINATION ADDRESS | REPEAT TIMES |
|---|---|---|---|

FIG. 7

| | | | | |
|---|---|---|---|---|
| COMMAND | SOURCE ADDRESS | DESTINATION ADDRESS | REPEAT TIMES | ENTRY 1 |
| COMMAND | SOURCE ADDRESS | DESTINATION ADDRESS | REPEAT TIMES | ENTRY 2 |
| ⋯ | ⋯ | ⋯ | ⋯ | |
| COMMAND | SOURCE ADDRESS | DESTINATION ADDRESS | REPEAT TIMES | ENTRY i |
| ⋯ | ⋯ | ⋯ | ⋯ | |

| COMMAND | SOURCE ADDRESS | DESTINATION ADDRESS | REPEAT TIMES | ENTRY 1 |
|---|---|---|---|---|
| COMMAND | SOURCE ADDRESS | DESTINATION ADDRESS | REPEAT TIMES | ENTRY 2 |
| | | • • | | |
| COMMAND | SOURCE ADDRESS | DESTINATION ADDRESS | REPEAT TIMES | |
| | | • • | | |

BANK 0 (rows 1–2), BANK 1 (lower rows)

APPARATUS AND METHOD FOR SCHEDULING USE OF BUS

BACKGROUND OF THE INVENTION

1. Field of the Invention

The present invention relates to computer apparatus having a plurality of units connected to a bus, or to continuous data server apparatus which utilizes a bus for data transfer between units.

2. Description of the Background Art

In computer systems which handle digital information, a bus is widely adopted as a cheap method of connecting a plurality of units. A problem in designing a system which uses a bus is that bandwidth bottleneck of the bus can easily occur. In order to increase the bandwidth of the bus, it may be possible to increase the number of signal lines or to raise the operating frequency of the bus. However, in either case, costs tend to increase.

A possible method of increasing bandwidth of the bus while avoiding increased costs may be to increase the use rate of the bus. However, when a plurality of units are connected to a bus, in general, the right to use the bus has to be arbitrated. The fact that such arbitration takes a certain time presents an obstacle to raising the use rate of the bus.

Moreover, in computer systems which employ a large number of memories, low-cost DRAMs are widely used as memories. When DRAMs are used in high-speed paging mode, they can accommodate a large bandwidth, but they are subject to a problem of large latency. Consequently, when data are transferred between a DRAM and a bus, this latency, in addition to the arbitration operation, further lowers the use rate of the bus.

One type of computer system which employs a bus is a continuous data server apparatus. A continuous data server for handling continuous data such as video data and/or audio data performs functions for reading out the continuous data stored in memory devices, and transfers the data (of a fixed quantity in a fixed period) continuously in real time while synchronizing in time with terminal devices.

Such a continuous data server apparatus is used in fields such as video-on-demand wherein video data comprising a plurality of video files are stored and an arbitrary video file is transferred in response to a request from a terminal, and an on-line shopping service wherein product information is provided by video through a network. Consequently, the continuous data server receives requests from a plurality of users at random, and is required to have a capability to transfer respectively different continuous data to a large number of users simultaneously.

An exemplary conventional continuous data server apparatus 700 has a configuration as shown in FIG. 1. In this continuous data server, an access request for continuous data issued by a user or an application program is sent between software processes or by means of communication via a network, etc. This access request is received by a communication control unit 702 and transmitted via a bus 704 to a central control device 706. Central control device 706 then instructs a storage unit 708 to read the requested continuous data. In response, a data storage control device 710 of storage unit 708 reads out the designated continuous data from a data storage device 712 and writes the data to a buffer memory 714. Central control device 706 then instructs one of communication control units 702 to transmit the data in buffer memory 714. In response, communication control unit 702 transfers the continuous data to a transfer destination designated in the access request. These operations are usually performed in units of a fixed time interval called a slot.

Another exemplary conventional continuous data server apparatus has a configuration as shown in FIG. 2. In this continuous data server, a "striping" technique is utilized. A series of storage units 708 are provided connected in parallel to bus 704. Continuous data is stored in the storage units 708 such that one continuous data stream is stored by dividing it among a plurality of disk devices which are the members of the series. The purpose of this technique is to make it possible for a greater number of users to access the same continuous data simultaneously and to increase an overall data transfer capability (total bandwidth).

In such conventional continuous data server apparatus, storage unit 708 and communication control unit 702 issue requests for using bus 704, and these requests are arbitrated by an arbitration device, not shown in the figures. If it has acquired the right to use the bus, storage unit 708 or communication control unit 702 transfers/receives data to/from buffer memory 714 using bus 704. As a result, the time required for the arbitration lowers the use rate of bus 704, and therefore decreases the number of users who can access simultaneously.

In addition, it is necessary for the continuous data server to always guarantee the transfer of a fixed quantity of data in a fixed time interval to each user terminal, in order to ensure that the user terminal can play the continuous data without interruption. For that purpose, the use rate of the bus is further lowered so as to provide a margin.

SUMMARY OF THE INVENTION

It is therefore an object of the present invention to provide a computer apparatus and a bus control scheme in which the use rate of a bus can be improved.

A further object of the present invention is to provide a continuous data server apparatus in which the use rate of a bus for data transfer can be increased while assuring uninterrupted transfer of a fixed quantity of data in a fixed time period to each user terminal.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

In accordance with the present invention, there is provided a computer apparatus, comprising a plurality of functional units, a bus for connecting the plurality of units, a memory for storing a program, and means for assigning a right to use the bus deterministically to each one of the plurality of units in accordance with the program stored in the memory.

Also, in accordance with the present invention, there is provided a continuous data server apparatus for transferring continuous data stored in a storage unit, the apparatus comprising a buffer memory unit for temporarily storing desired continuous data read out of the storage unit, a plurality of communication control units for transferring the desired continuous data stored in the buffer memory unit to a communication path, a bus for connecting the buffer memory unit and the plurality of communication control units, a memory for storing a program, and means for assigning a right to use the bus deterministically to the buffer memory unit for transferring the desired continuous data to at least one of the plurality of communication control units in accordance with the program stored in the memory.

Further, in accordance with the present invention, there is provided a bus controlling method in a computer having a plurality of functional units and a bus connecting the plurality of units, comprising the steps of storing a program for assigning a right to use the bus in a memory, assigning a right to use the bus deterministically to each one of the plurality of units in accordance with the program stored in the memory, and using, by each of the units, the bus in accordance with the assigned right to use.

Other features and advantages of the present invention will become apparent from the following description taken in conjunction with the accompanying drawings.

Both the foregoing general description and the following detailed description provide examples consistent with this invention and explain how to make and use systems and methods consistent with the invention. These description do not restrict the claimed invention.

The accompanying drawings are included to provide a further understanding of the invention and are incorporated in and constitute a part of this specification, illustrate several embodiments of the invention and, together with the description, serve to explain the principles of the invention.

BRIEF DESCRIPTION OF THE DRAWINGS

FIGS. 6(a) and 6(b) show an exemplary format of an instruction in a program stored in a micro-schedule table.

FIG. 7 shows an exemplary format of the micro-schedule table.

DETAILED DESCRIPTION OF THE PREFERRED EMBODIMENTS

Now, embodiments according to the present invention will be described in detail.

In a computer apparatus of the embodiments, a plurality of units use a bus in accordance with deterministic allocation by a micro-scheduler of a right to use the bus. A continuous data server apparatus for servicing continuous data such as video and/or audio data in response to a plurality of simultaneous access requests will be taken as an example of the computer apparatus in the embodiments. Thus, as used herein, the term "computer apparatus" is used to broadly cover any apparatus suitable for effecting data transfers of the types generally described herein.

In the first embodiment and the second embodiment, the present invention is practiced with the communication control units of the continuous data server. In the third embodiment, the present invention is practiced with both the communication control units and the storage units of the continuous data server.

Referring now to FIG. 3 to FIG. 14, the first embodiment will be described.

Figure 3:
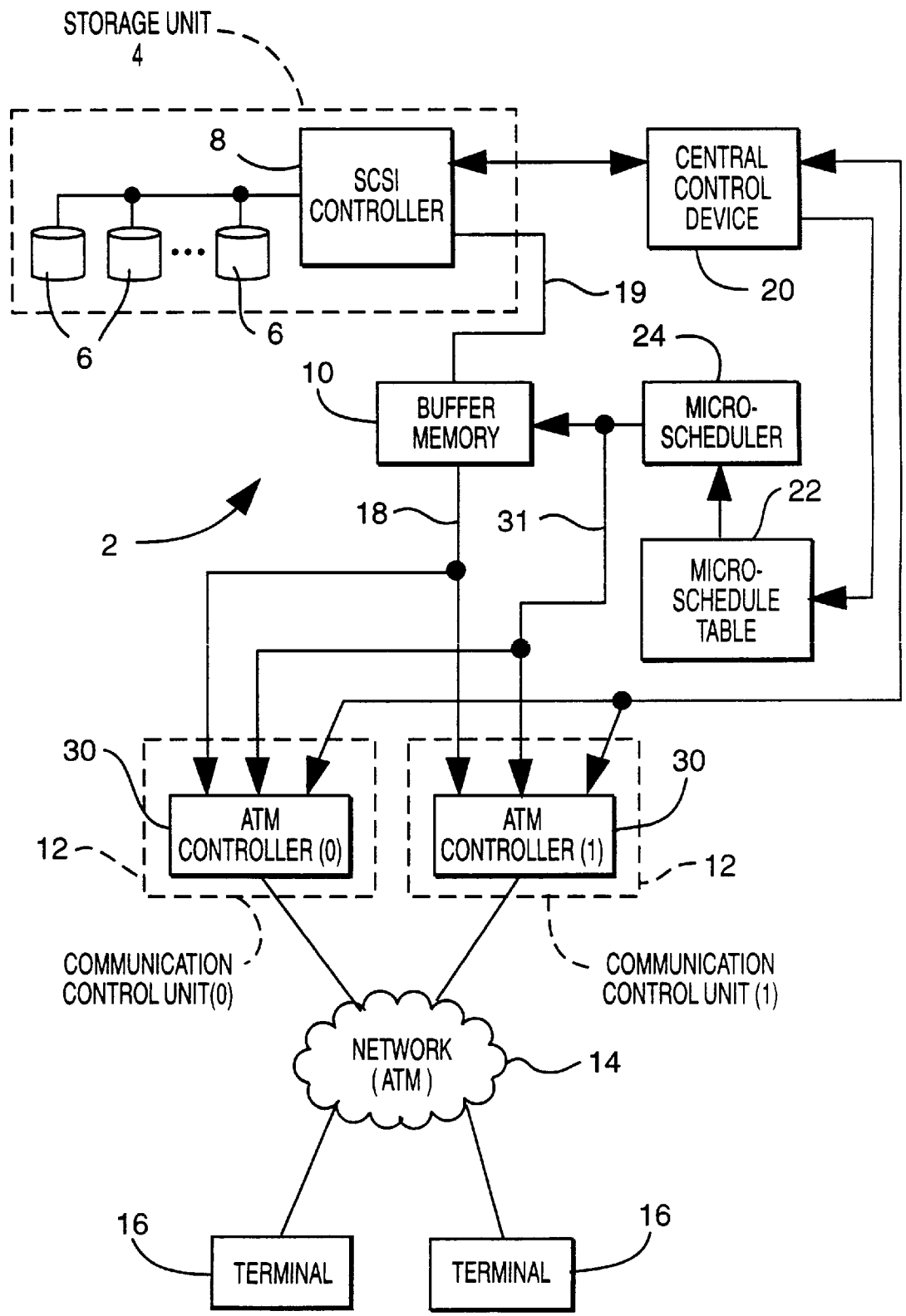
FIG. 3 is a block diagram of a first embodiment of a continuous data server apparatus according to the present invention.

FIG. 3 shows a configuration of a continuous data server apparatus 2 according to the first embodiment. An example of downloading to a network or user is described.

Continuous data server apparatus 2 shown in FIG. 3 comprises: a storage unit 4 including a prescribed number of data storage devices (disk) 6 which store continuous data and a data storage control device (SCSI controller) 8 which reads data out of data storage devices 6; a buffer memory 10 which temporarily stores data read from storage unit 4; one or more (in this case two) communication control units 12 which transfer the data of buffer memory 10 to a network 14 addressed to each user terminal 16; a bus (VBUS) 18 that connects buffer memory 10 and communication control units 12; and a bus (HBUS) 19 that connects storage unit 4 and buffer memory 10.

While the present embodiment is described with respect to an example of downloading, it is noted that in case of uploading, communication control unit 12 transfers data to buffer memory 10, buffer memory 10 stores the data temporarily, and data storage control device 8 writes the data stored in buffer memory 10 into data storage devices 6.

The continuous data server apparatus further comprises: central control device 20 which controls the entire system, in particular, setting up the network and scheduling the reading of data from data storage devices 6 and sending the data to network 14 in response to requests from terminals 16; a micro-schedule table 22 which stores a program indicating a micro-schedule determined by central control device 20; and a micro-scheduler 24 which deterministically assigns the right to use bus 18 to buffer memory 10 or communication control units 12 in accordance with the program stored in micro-schedule table 22.

Figure 1:
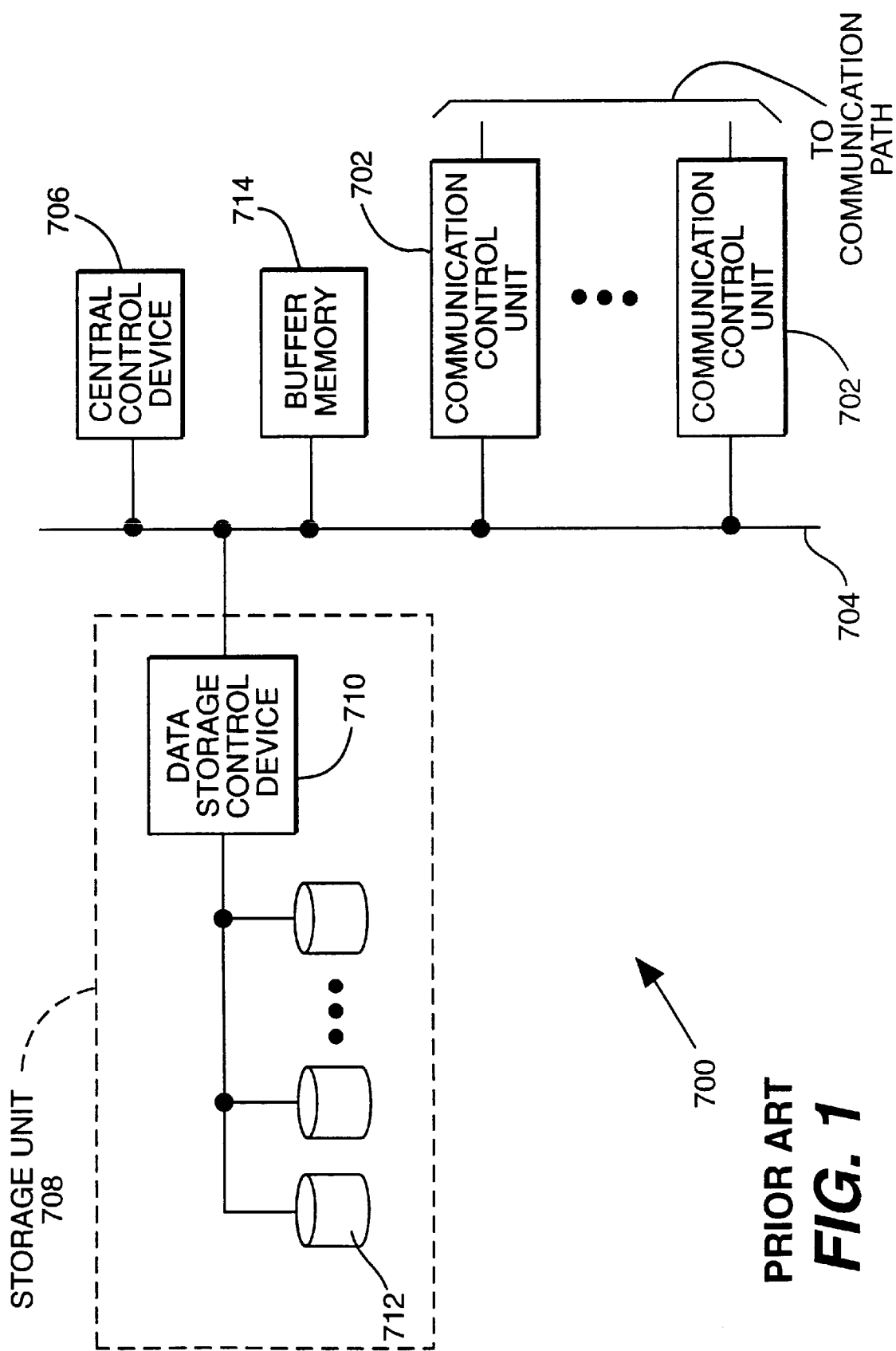
FIG. 1 is a block diagram of one conventional continuous data server apparatus.
Figure 2:
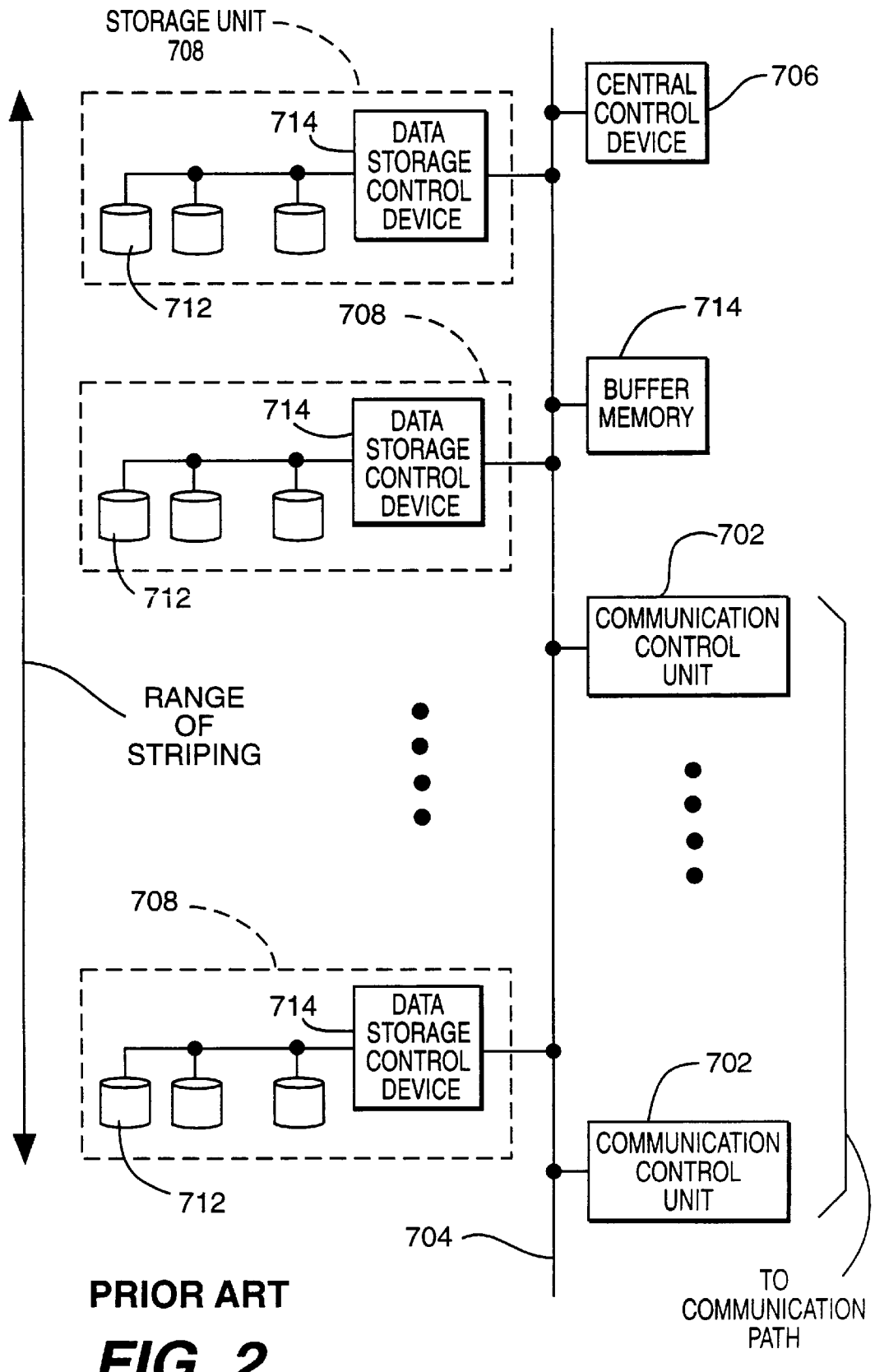
FIG. 2 is a block diagram of another conventional continuous data server apparatus.

The functions of storage unit 4, communication control unit 12, and buffer memory 10 are essentially the same as those of the corresponding units in FIGS. 1 and 2. However, in this embodiment, central control device 20 issues operation instructions to storage unit 4 and communication control units 12 in slots (fixed time intervals) and writes the program indicating the micro-schedule into micro-schedule table 22. Micro-scheduler 22 deterministically controls the use of bus 18 by buffer memory 10 and communication control units 12 in accordance with this program. As used herein, such deterministic control means control performed independently of the requirements of the units, e.g., units 12 and buffer memory 10 to use bus 18.

In performing such control, micro-scheduler 22 or any arbitration device does not arbitrate the right to use the bus dependent on bus use requests from the various units. Instead, micro-scheduler 22 guarantees bus use times to each unit by assigning the right to use the bus in accordance with a predetermined micro-schedule. In this way, a fixed quantity of continuous data is transferred to one of the communication control units 12 in a fixed time, and a fixed quantity of continuous data can be guaranteed to be transferred onto the communication path in a fixed interval, while the use rate of the bus can be increased. Consequently, the number of users who are served concurrently can be increased.

Further advantages resulting from operation of micro-scheduler 22 are that the capacity of buffer memory 10 and a packet memory which temporarily stores continuous data until the data is transferred to the communication path by communication control unit 12 can be reduced. Also, the capacity of a buffer in a user terminal located on the communication path, which holds received packets until the continuous data becomes playable, can be reduced.

Next, configurations of central control device 20, storage unit 4 and communication control units 12 will be described.

Central control device 20 may comprise, for example, a CPU and memory device as in an electronic computer, and execute software for controlling the entire system by the CPU. Central control device 20, in order to control the entire system, manages (or can ascertain) the specification of each set of continuous data stored in the system, the arrangement of the various sets of continuous data on each data storage device 6, the communication path to which each communication control unit 12 can connect, and so on. An exemplary specification of the continuous data may include information for specifying each set of continuous data, such as a name of the continuous data or an ID code, the total data length of each set of continuous data, or the total number of blocks in cases in which the continuous data are divided into a plurality of blocks.

Data storage devices 6 for storing the continuous data are usually provided in the form of disk devices. For such disk devices, a magnetic disk device is used in most cases, but an optical disk or an opto-magnetic disk device, etc., can be used. Instead of the disk device, a semiconductor memory device such as RAM or EEPROM can be used as the data storage device. The continuous data stored in data storage devices 6 are data having a structure such as a continuous stream of bits or bytes. Preferably the continuous data is stored and managed in bundled units such as blocks.

Data storage control device 8 reads out continuous data stored in respective data storage devices 6 and writes the data into a designated address in buffer memory 10. In the case of uploading, data storage control device 8 reads out continuous data stored in buffer memory 10 and writes the data into a corresponding data storage device 6. In this embodiment, it is assumed that a magnetic disk device having an SCSI interface is used as data storage device 6. Hereinafter, data storage device 6 is referred to as "disk 6," data storage control device 8 is referred to as "SCSI controller 8." A typical example of continuous data is video data. In this case, the continuous data server device is called a video server.

Communication control unit 12 reads out continuous data from a designated address of buffer memory 10 and transfers the data to a communication path of network 14. In the case of uploading, communication control unit 12 works in the opposite direction.

Communication control unit 12 can be connected to an ATM network, Ethernet, or FDDI, etc. Although in this embodiment network 14 is represented as an ATM network and communication control unit 12 as an ATM controller 30, in the case of using a network based on another protocol, there may be provided a suitable interface function adapted to the network to be connected in communication control unit 12.

Figure 4:
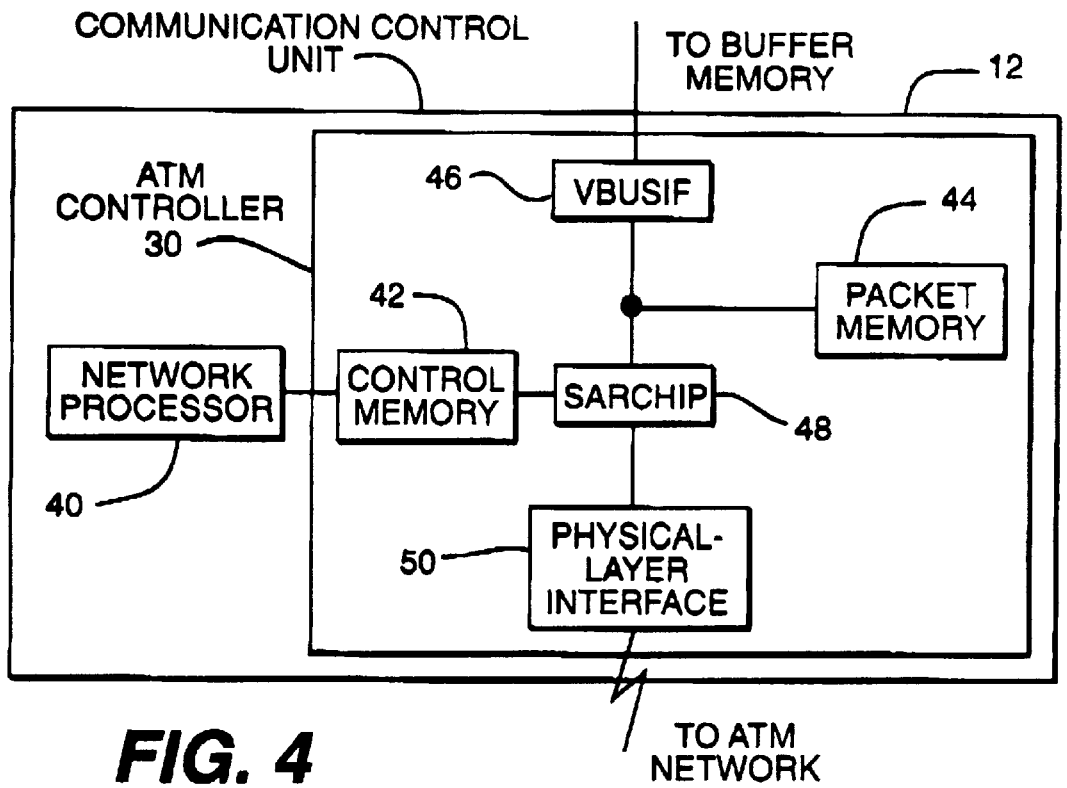
FIG. 4 shows an exemplary internal configuration of a communication control unit.

FIG. 4 shows an exemplary internal configuration of communication control unit 12. Communication control unit 12 includes ATM controller 30 and a network processor 40.

Network processor 40 sets up a control memory 42 in ATM controller 30 in accordance with the instructions of central control device 20. Information for an ATM circuit set-up and for buffer set-up in a packet memory 44 will be stored in control memory 42. The data from buffer memory 10 is temporarily stored in packet memory 44 in ATM controller 30 after passing through a bus interface unit (hereinafter called VBUSIF) 46. The data sent to packet memory 44 is assembled into ATM packets and converted into a physical-layer signal by a SAR chip unit (hereinafter called SARCHIP) 48, and then is transferred to ATM network 14 through a physical-layer interface unit 50.

Next, the operation of the above described continuous data server will be described.

When one of user terminals 16 issues an access request to the continuous data server, central control device 20 looks up, for example in a table maintained in central control device 20, in what portion of what disk device 6 in storage unit 4 the requested continuous data are to be found, and constructs a schedule for disk access such that disk access will not conflict with requests from other user terminals.

In general, accessing in large continuous units will achieve a high access efficiency of disk device 6, so the continuous data server reads out digitized compressed data in comparatively large units (for example 128 KByte) and writes them into buffer memory 10. In a case where the data are read at a rate of, for example, 4 Mbps, playing the data takes about 250 msec. Disk access of 128 KByte is much faster than the playing speed of 250 msec. For example, disk access is completed in 60 msec. This means that a plurality of requests for continuous data can be handled concurrently by a single disk device.

Central control device 20 serves in response to requests from a large number of users by adjusting the requests by means of software called "scheduler," which makes an efficient schedule such that there occurs no conflict of disk access at disk device 12. To simplify the control, the scheduler supplies commands to SCSI controller 18 in storage unit 4 at every specific time interval called a "slot," determining the scheduling for the next slot (or some slots ahead) by the end of each slot break.

From central control device 20 which has performed scheduling as described above in accordance with the request from user terminal 16, SCSI controller 8 in storage unit 4 will receive instructions, and then reads the requested data out of disk device 6. The controller 8 then sequentially stores the read data into a designated address of buffer memory 10.

In the same way as above, central control device 20 determines the scheduling for the data transfer to terminals 16 for every slot, and issues an instruction to ATM controller 30 in communication control unit 12. Then, buffer memory 10 outputs data under the control of micro-scheduler 24 and to communication control unit 12 obtains the output data under the control of micro-scheduler 24.

A fixed amount of continuous data is thereby transferred in each fixed period, e.g., a slot, from communication control unit 12 addressed to each requesting user terminal 16 through network 14.

Next, the operation of micro-scheduler 24 will be described in detail.

Micro-scheduler 24 controls the use of bus 18 connecting buffer memory 10 and communication control units 12 in accordance with a micro-scheduling program stored in micro-schedule table 22. Specifically, micro-scheduler 24 reads control commands, including operation commands to target units, one by one out of each entry of micro-schedule table 22, and gives the operation command to a corresponding target unit.

This micro-scheduler-based control makes it possible to let only the corresponding target unit with permission use bus 18 at each time.

The right to use the bus is assigned to a target unit which has received a command instructing it to output data onto the bus. Another target unit which has received a command instructing it to input the data on the bus is a receiving unit for using the bus. In this embodiment, in the case of downloading, the right to use the bus is assigned to buffer memory 10 and one of communication control units 12 becomes a target unit which is the receiving unit of the unit having the use right of the bus. In contrast, for uploading, the use right is assigned to one of communication control units 12 and buffer memory 10 becomes a receiving target unit. In cases where there are a plurality of buffer to memories in the apparatus, such as in the second embodiment, described below with respect to FIG. 15, one of the buffer memories 10 which has received the command from micro-scheduler 24 becomes a receiving target unit.

Figure 5:
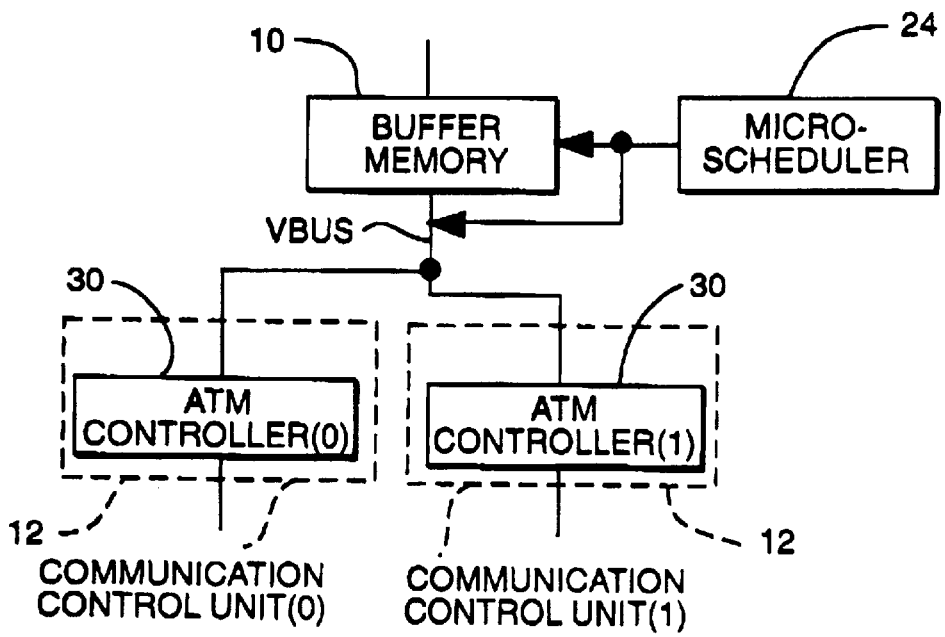
FIG. 5 partly shows another configuration of the first embodiment of a continuous data server.

It should be noted that the commands can be communicated to each communication control unit 12 through bus 18 as shown in FIG. 5, though they are communicated through a control bus 31 independent of bus 18 in FIG. 3. The configuration of FIG. 3 can achieve higher use rate of bus 18.

The micro-scheduling program described above is determined by central control device 20 and stored in micro-schedule table 22. Micro-schedule table 22 includes an SRAM or the like and is rewritten by central control device 20 for every slot. This rewriting corresponds to the control of disk device 6 being altered for each slot.

Micro-schedule table 22 can include a plurality of memory banks, and writing from central control device 20 to a given bank can be executed in parallel with reading under the control of micro-scheduler 24 from another bank.

Next, the format of the micro-scheduling program stored in micro-schedule table 22 will be described.

Micro-schedule table 22 stores, in the form of a table, control instructions of a prescribed format for example as in FIGS. 6(a) and 6(b). As shown in FIG. 6(a), in each entry there is written an instruction comprising at least a command (indicating an operation mode), a source address, and a destination address. In this embodiment, as will be described in more detail below, as shown in FIG. 6(b), the entry also includes the number of times of repeating the command. It is possible for micro-schedule table 22 to include a NOP command which instructs to do nothing.

In the fields of "command," there are stored commands for a memory controller (not shown in the figure) in buffer memory 10 and for ATM controllers 30 in communication control units 12. In this embodiment, such commands may be of the following two types:

(1) Send command: transfer from the buffer memory 10 to the packet memory in the ATM controller 30. This corresponds to the case of downloading.

(2) Read command: transfer from the ATM controller 30 to the buffer memory 10. This corresponds to the case of uploading.

Apart from those commands, in a case where a RAID (Redundant Arrays of Inexpensive Disks) technique is employed in the storage system, the micro-scheduler can send a command to the memory controller instructing recovery of data from the RAID in the event of failure of a disk device of the RAID. In this case, when the central control device detects a disk device error, it writes a command for RAID into the micro-schedule table. The micro-scheduler can also send a command to the memory controller to calculate parity data for data being transferred from ATM controller 30 to the RAID via buffer memory 10.

In the case of a "send command," the source address is a head address for reading of buffer memory 10 in which the data is stored, and the destination address is address information of packet memory 44 in ATM controller 30 which is the target unit. In the case of a "read command," the opposite applies.

FIG. 7 shows an exemplary format of the micro-schedule table. The micro-schedule table includes a plurality of the micro-schedule instructions shown in FIG. 6 arranged in a table structure. Micro-scheduler 24 executes these commands sequentially, one entry at a time.

For example, within micro-scheduler 24, there is provided a pointer that holds the entry position of the micro-schedule table which is to be executed next. Micro-scheduler 24, on the basis of the content of the entry at the position pointed to by this pointer, issues a data transfer command to (the memory controller of) buffer memory 10 and (ATM controller 30 of) communication control unit 12. This command causes data to be sent from buffer memory 10 in which the data is stored to one of communication control units 12 which is currently the target unit ("send command"), or, alternatively, to be read from one of communication control units 12 being the current target unit to buffer memory 10 ("read command").

In addition, in FIG. 7, there is provided a field of "repeat times" in each entry of the micro-schedule table. This field shows information indicating how many times each respective entry is to be executed before going on to the next entry. The value of the pointer is therefore not updated while a command at the same entry position is being repeated as many times as the field indicates.

As described above, in this embodiment, the scheduler in central control device 20 constructs a micro-schedule table while scheduling disk accesses. This micro-schedule table is controlled in units much finer than a slot. For example, in this embodiment, it is assumed that the minimum unit of control is four words (sixteen bytes) and that four-word data can be read in four clock pulses. To consider reading efficiency, this minimum unit may be a unit for continuous reading of buffer memory (e.g., the burst size of synchronous DRAM). This minimum unit will hereinafter be called a "micro-slot." Micro-scheduler 24 therefore reads instruction information out of the micro-schedule table at every micro-slot and executes the read instruction.

In the case where a micro-schedule table is provided covering one slot (for example 60 msec), assuming that one clock pulse is 40 nsec, about 380K of entries would be required. Such a large amount of entries would cause problems both in terms of memory cost for the micro-schedule table and the time required for transfer from central control device 20. The number of entries can therefore be decreased by the following methods, enabling the memory cost of the micro-schedule table to be reduced.

The first method is to divide a slot into "mini-slots." The whole micro-schedule table is used repeatedly by the number of times equal to the number of mini-slots. If, for example, a 1K memory for entries is provided, the table is used repeatedly 380 times. In this way, the memory capacity can be reduced, in this example by a factor of 1/380. This method can easily be implemented, for example, by providing a counter in micro-scheduler 24.

The second method, as shown in FIG. 7, is to provide a "repeat times" field for each entry in the micro-schedule table, so that a single entry is executed a plurality of times.

Also, by combining the above two methods, the memory capacity of the micro-schedule table can be further reduced.

Figure 8:
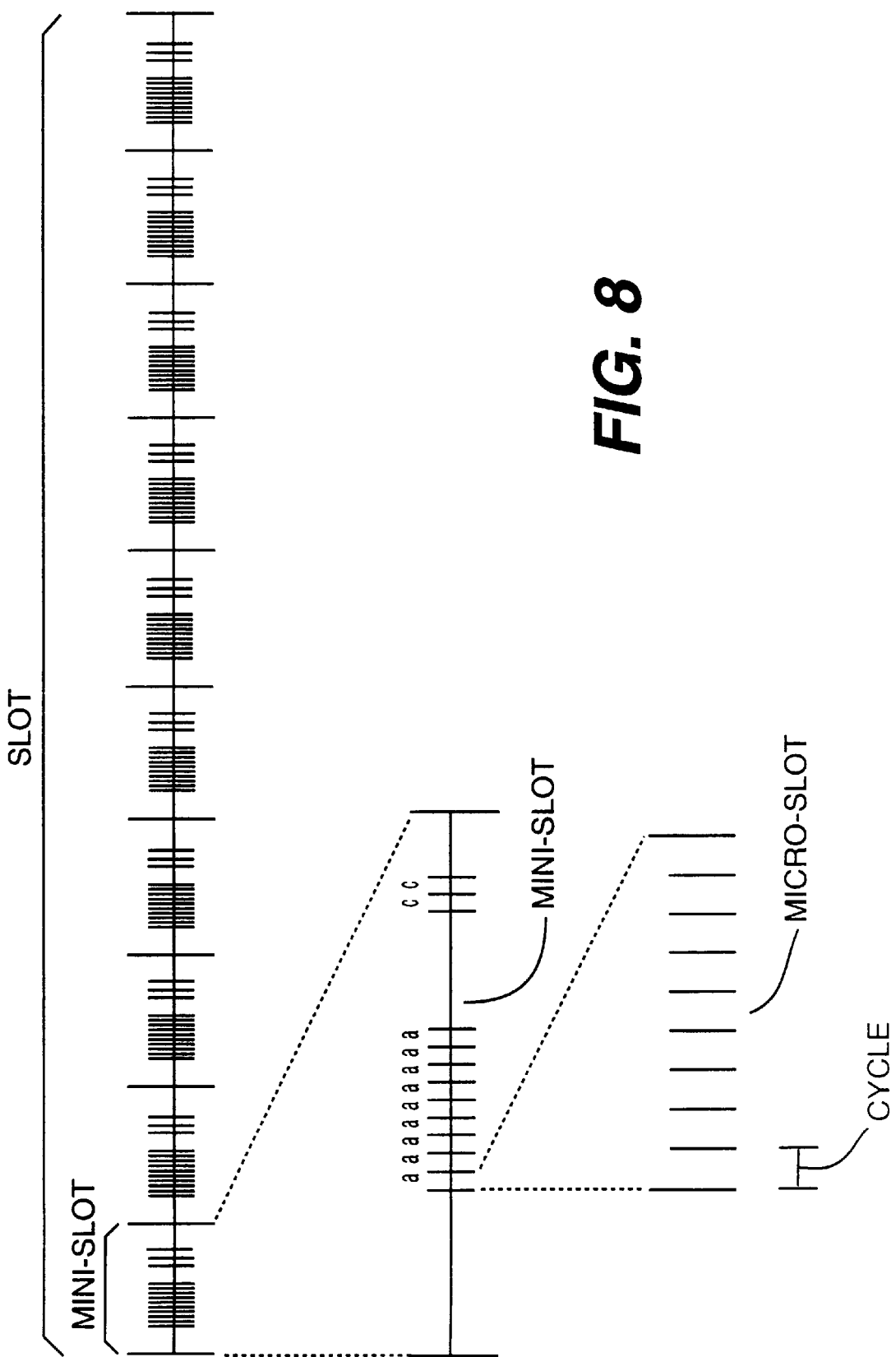
FIG. 8 explains the relationship among micro-slots, mini-slots and slots.

The relationship among micro-slots, mini-slots and slots in this embodiment will now be described, referring to FIG. 8.

As described above, a micro-slot is constituted of a fixed number of bus cycles. In this example, ten cycles correspond to one micro-slot. One micro-slot corresponds to one command in the micro-schedule table. In the micro-slot shown to a larger scale in FIG. 8, data destined to user 'a' are transferred.

A fixed number of micro-slots are treated as one mini-slot. FIG. 8 shows the transfer of data destined to user 'c' and data destined to user 'a'. In this example, the data to user 'a' occupies nine micro-slots within one mini-slot. This can be implemented by the second method described above, where the same transfer command is repeatedly executed for a plurality of micro-slots within one mini-slot.

A slot is constituted of a fixed number of mini-slots. In this example, ten mini-slots correspond to one slot. With the first method described above, one mini-slot corresponds to one pass through the micro-schedule table. This mini-slot is executed repeatedly, as shown in FIG. 8.

Thus, the sending of data to each user terminal with a fixed rate in one slot can be assured by sending continuous data to communication control unit 12 at regular intervals shorter than the slot. When the sending of data with a fixed rate is assured in this way, the size of packet memory 44 within ATM controller 30 and/or the buffer of user terminal 16 can be reduced.

Thus, according to this embodiment, the micro-scheduling program can be constructed such that the right to use bus 18 is assigned to buffer memory 10 with one of communication control units 12 at a fixed position in each mini-slot to deliver the data to the corresponding user terminal. The mini-slots are obtained by dividing the slot into a plurality of equal parts. By controlling bus usage in accordance with this program, it becomes possible to assure that continuous data will be sent to communication control unit 12 at regular intervals shorter than the slot.

Also, the micro-scheduling program can be constructed such that the right to use bus 18 is assigned to buffer memory 10 with one of communication control units 12 in micro-slots. The number of micro-slots is in proportion to a bit rate of the data to be transferred to the corresponding user terminal. The micro-slots are obtained by dividing the slot into a plurality of equal parts. In case of also utilizing mini-slots, the micro-slots are obtained by dividing the mini-slot into a plurality of equal parts. By controlling bus use in accordance with this program, it becomes possible to ensure a period of bus use corresponding to the bit rate required by each user terminal in each slot. For that purpose, the "repeat times" field is set to the number corresponding to the bit rate.

Next, a case in which the micro-schedule table is divided into a plurality of banks and executed while changing over between these banks will be described.

Figures 9, 11:
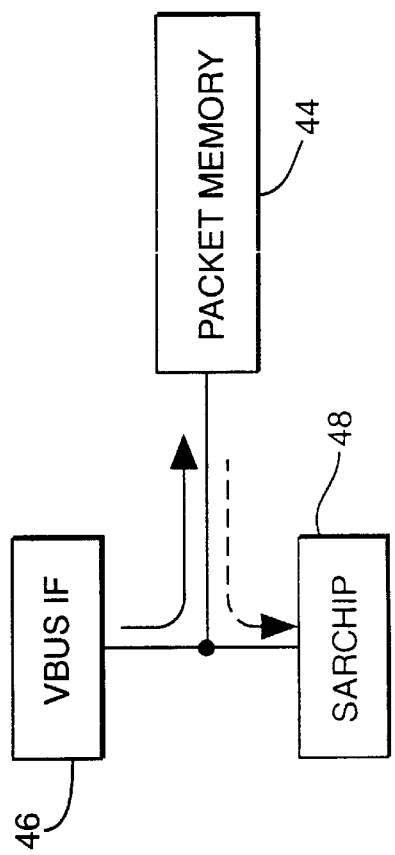
FIG. 9 shows an example in which the micro-schedule table is divided into a plurality of banks.
FIG. 11 diagrammatically illustrates the flow of data within the communication control unit.

FIG. 9 shows an example in which the micro-schedule table is divided into two banks. This example corresponds to the case in which there are two communication control units 12 as shown in FIG. 3. The respective banks correspond to micro-schedules for the communication control units.

Figure 10:
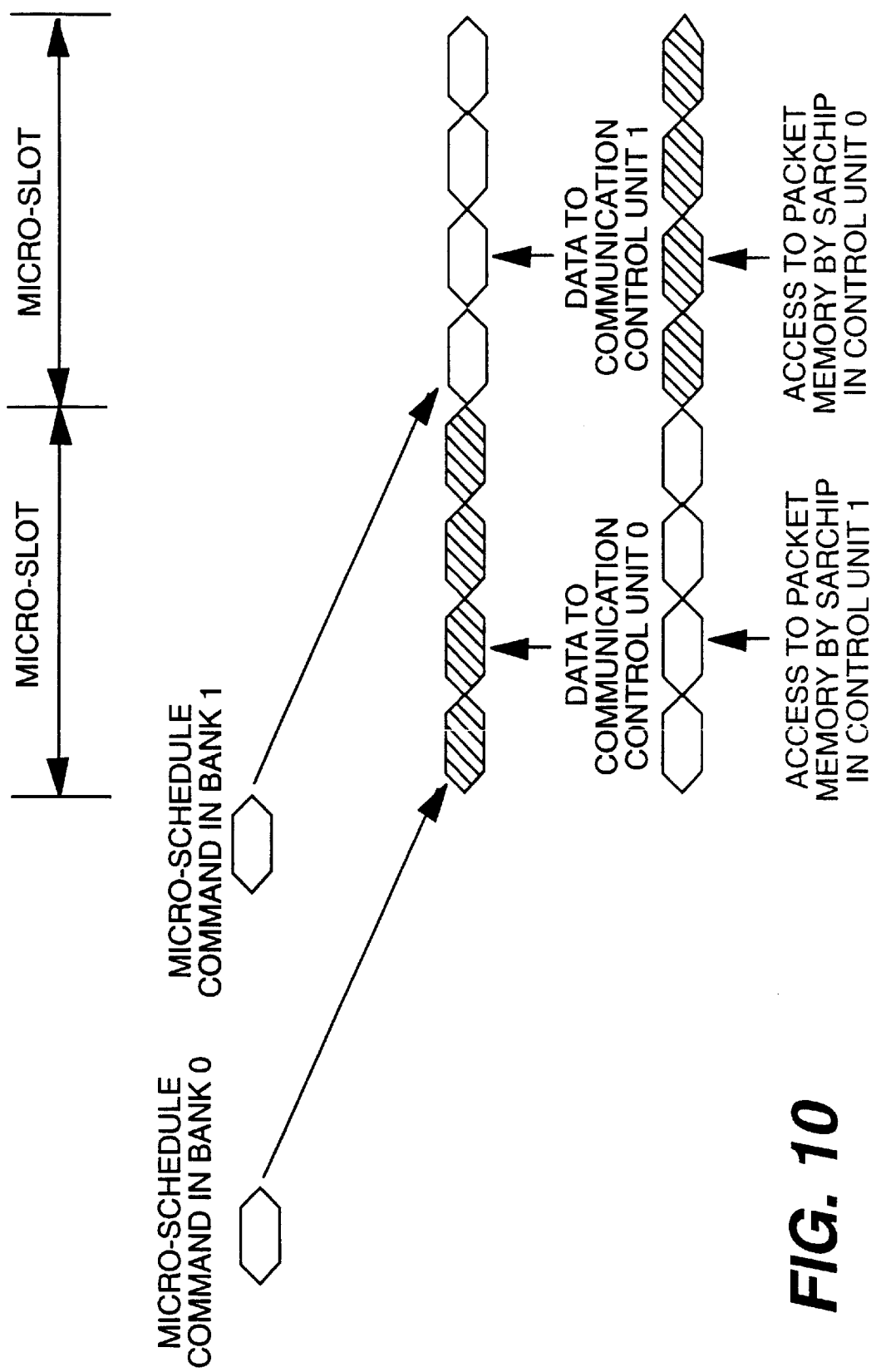
FIG. 10 is a time chart of transfer to two communication control units (0) and (1) through a bus.

Micro-scheduler 24 executes Bank 0 and Bank 1 alternately for each micro-slot. FIG. 10 shows a time chart for transfer to two communication control units (0) and (1) through bus 18.

The benefit of using this method is that the bandwidth bottleneck of packet memory unit 44 in ATM controller 30 can be alleviated. For example, if communication control unit (0) is continuously commanded, packet memory 44 in communication control unit (0) would be in a written mode on every clock pulse, making it impossible to accept a request from SARCHIP 48. As a result, the sending of an ATM packet is possibly obstructed. This is because, as shown in FIG. 11, SARCHIP 48 cannot access packet memory 44 due to data transfer from VBUSIF 46. Constructing packet memory 44 as a dual port memory could be considered, but this would increase cost.

Accordingly, if the commands from micro-scheduler 24 are divided into two parts and executed alternately by two communication control units (0) and (1) as in this embodiment, the transfers from buffer memory 10 to packet memory 44 can be halved, thereby enabling the bandwidth bottleneck to be alleviated.

Next, the relationship between the micro-schedule table, the banks, and the micro-slots will be described.

Figure 12:
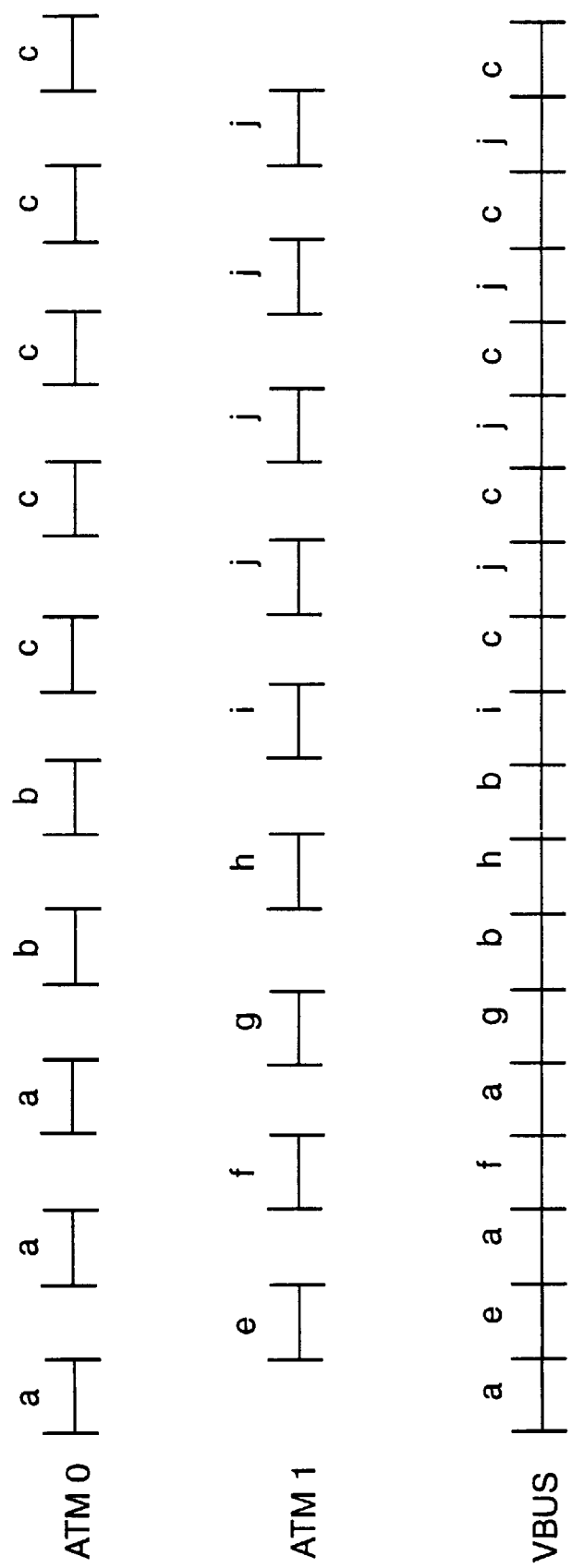
FIG. 12 shows the relationship between a plurality of banks and micro-slots.

FIG. 12 shows the relationship between two banks and micro-slots described in this embodiment. Each "scale graduation" in FIG. 12 corresponds to one micro-slot. The transfer to ATM controller (0) is described in Bank 0 and the transfer to ATM controller (1) is described in Bank 1. The small letters in FIG. 12 indicate data to be transferred to respectively different user terminals. Data are sent to ATM controller (0) in the sequence: a, a, a, b, b, c, c, c, c, c; and to ATM controller (1) in the sequence: e, f, g, h, i, j, j, j, j. This example shows that bus 18 is used by interleaving data to ATM controller (0) and ATM controller (1) at each micro-slot.

It is noted that the micro-schedule table could be divided into three, four, or more banks depending on a configuration of the communication control units and ATM controllers.

It is also noted that using the micro-schedule table has another advantage. If the micro-schedule table is repeatedly used for the number of times of the slot division, and/or, as shown in FIG. 5 or FIG. 7, the entry in the micro-schedule table is repeatedly executed for the number of times indicated by the "repeat times" field in each entry, the source address and destination address fields of the entry are updated on each repetition. For example, if 16 bytes of data are transferred when one entry of the micro-schedule table is executed once, the addresses are incremented by 16 bytes.

This address update function shows that micro-scheduler 24 acts as a DMA controller. In general, due to restrictions of hardware resources, a DMA controller supports only a restricted number of channels. For example, in the case of a two-channel DMA controller, data can be transferred in respect of two different source/destination address pairs; however, if transfer on more than two channels is required, the DMA resource must be reset by the processor before the transfer.

However, in continuous data server apparatus according to the present invention, transfer between the buffer memory and the packet memories in the communication control units requires a number of channels which is equal to the number of users supported by the continuous data server. As a result, resetting the DMA by the processor would represent a considerable load on the processor.

According to this embodiment, when micro-scheduler 24 is considered as a DMA controller, the supportable number of channels is prescribed by the number of entries in the micro-schedule table. Since the micro-schedule table is implemented by memory, for example even 1000 channels or more can be supported. When micro-scheduler 24 is employed, the setting for the DMA would need to be performed at most once in one slot, and interruption in the processor to reset the DMA will not occur within each one slot.

Next, a case of uploading data from a user terminal or an archive device containing continuous data contents will be described.

Uploading is an operation necessary for adding new contents to a continuous data server. Uploading is performed by allowing the data to flow onto bus 18. Specifically, continuous data transferred in the form of ATM packets from an archive device to ATM network 14 may be read onto bus 18 through communication control unit 12, or continuous data may be read by connecting a tape device, disk device, or the like directly to communication control unit 12.

This uploading may be performed concurrently with downloading. For such concurrent operations, central control device 20 determines combined scheduling for data transfer on bus 18 from buffer memory 10 to communication control unit 12 and from communication control unit 12 to buffer memory 10, and writes the micro-scheduling program into micro-schedule table 22 for controlling bidirectional use of bus 18.

Even in uploading, the read data is sent through bus 18 with a timing which is deterministically controlled by micro-scheduler 24 in just the same way as downloading. The data on bus 18 is written into buffer memory 10 and then written from buffer memory 10 to storage unit 4.

Data received from the ATM network is written into packet memory 44 by SARCHIP 48. Packet memory 44 acts as a buffer between the ATM network 14 and the continuous data server. The interior of packet memory 44 is managed, for example, as a ring buffer whose write pointer is advanced when being written into from ATM network 14; in contrast, its read pointer is advanced by the network processor 40 by the amount set in the micro-schedule table at each slot. The write pointer can be managed by SARCHIP 48.

In the micro-schedule table, there is written a command to write data into buffer memory 10 from packet memory 44 of ATM controller 30. By executing this command, data is sent to bus 18 from packet memory 44 of ATM controller 30 and the uploaded data on bus 18 is written into buffer memory 10.

In this case, if the supply of data from ATM network 14 to packet memory 44 is slower than the reading of data out of packet memory 44 onto bus 18 scheduled by micro-scheduler 24, it is possible for the ring buffer to become empty. If the supply of data cannot catch up and the ring buffer does actually become empty, the system falls into a condition where no data corresponding to a command from micro-scheduler 24 is present on bus 18. Therefore, network processor 40 of communication control unit 12 detects this empty condition and then issues a control signal at the timing with which micro-scheduler 24 requests reading out of packet memory 44, so that data will not be put onto bus 18. Also, since there is no data on bus 18, micro-scheduler 24 does not increment the addresses in the entry and gives an instruction not to write into memory to buffer memory 10.

The above condition may be generated when the bit rate from ATM network 14 is not constant. If the bit rate is constant, packet memory 44 functions as a buffer without need for actuating the above mechanism, and packet memory 44 will not become empty. In contrast, if the bit rate is not fixed, it is preferable to store commands for reading from ATM network 14 at the maximum anticipated rate in micro-scheduler 24 and to activate the mechanism described above.

Hereinabove, as one example, a method of uploading data from the ATM network through the bus 18 was described. However, it would be possible to add a device to supply data directly to bus 18.

Next, an exemplary internal configuration of micro-scheduler 24 and micro-schedule table 22 will be described, referring to FIG. 13.

An SRAM is used for micro-schedule table 22 and central control device 20 can write information into this SRAM. In FIG. 13, SRAM 22 is divided into two banks: Bank 0 and Bank 1, corresponding to the number of communication control units 30 (see FIG. 9). A program which becomes the basis for the designation of the respectively corresponding target unit is stored in each memory bank. Corresponding to these banks, the pointer and repeat counter, to be described, are also duplicated. Changeover between these banks is done by a BANK signal shown in FIG. 13. The BANK signal is a signal that is repeatedly inverted between 1 and 0 for each micro-slot. In this way, data are transferred in a manner of interleaving the designations for respective communication control units at each micro-slot.

The information read by micro-scheduler 24 from micro-schedule table 22 is temporarily stored in a register 60. A bus between micro-schedule table 22 and register 60 is a tri-state bus. Concurrently, if the content of the command field is "send command," the source address and command are sent to buffer memory 10 while the destination address and command are sent to one of ATM controllers 30. If the content of the command field is "read command," the destination address and command are sent to buffer memory 10, while the source address and command are sent to one of ATM controllers 30, respectively.

The source address and the destination address are incremented by an increment number, by respective incrementers 62 and 64. The increment number is a buffer address interval corresponding to the amount of data transferred in one micro-slot. Then, the information in micro-schedule table 22 is rewritten to reflect the incremented information through a write gate 66 which is a tri-state gate.

The initial value of a CONT bit is set to '1'. The "repeat times" information in register 60 is then loaded into a repeat counter 68 or 70, and '0' is written back as the CONT bit into register 60. The loading of the "repeat times" information into repeat counters 68 and 70 is enabled by an enable signal EN generated by logic including AND gates 76 and 78, respectively. The BANK signal is applied to gates 78 and 76 directly and inverted, respectively. The CONT bit is also applied to gates 76 and 78. As a result, the "repeat times" information is loaded into each of repeat counters 68 and 70 upon enablement by signal EN.

While the CONT bit is set to '0', the value in each of repeat counters is decremented by 1 every time the corresponding entry in micro-schedule table 22 is executed. When repeat counter 68 or 70 becomes 0, a pointer 72 or 74, respectively, which points to the entry position of the micro-schedule table to be executed next, is incremented, and '1' is again written back as the CONT bit. A multiplexer MPXA 80 is connected to receive the outputs of pointers 72 and 74. Multiplexer 80 selects one of these outputs according to the BANK signal applied thereto.

The above operations are continued until all of the entries in the micro-schedule table 22 have been executed. Then, the above operation is repeated as many times as the number of mini-slots in one slot, with the addresses in the micro-schedule table being updated by rewriting through write gate 66. After the operation is complete for one slot, new contents will be stored into micro-schedule table 22 by central control device 20.

Figure 13:
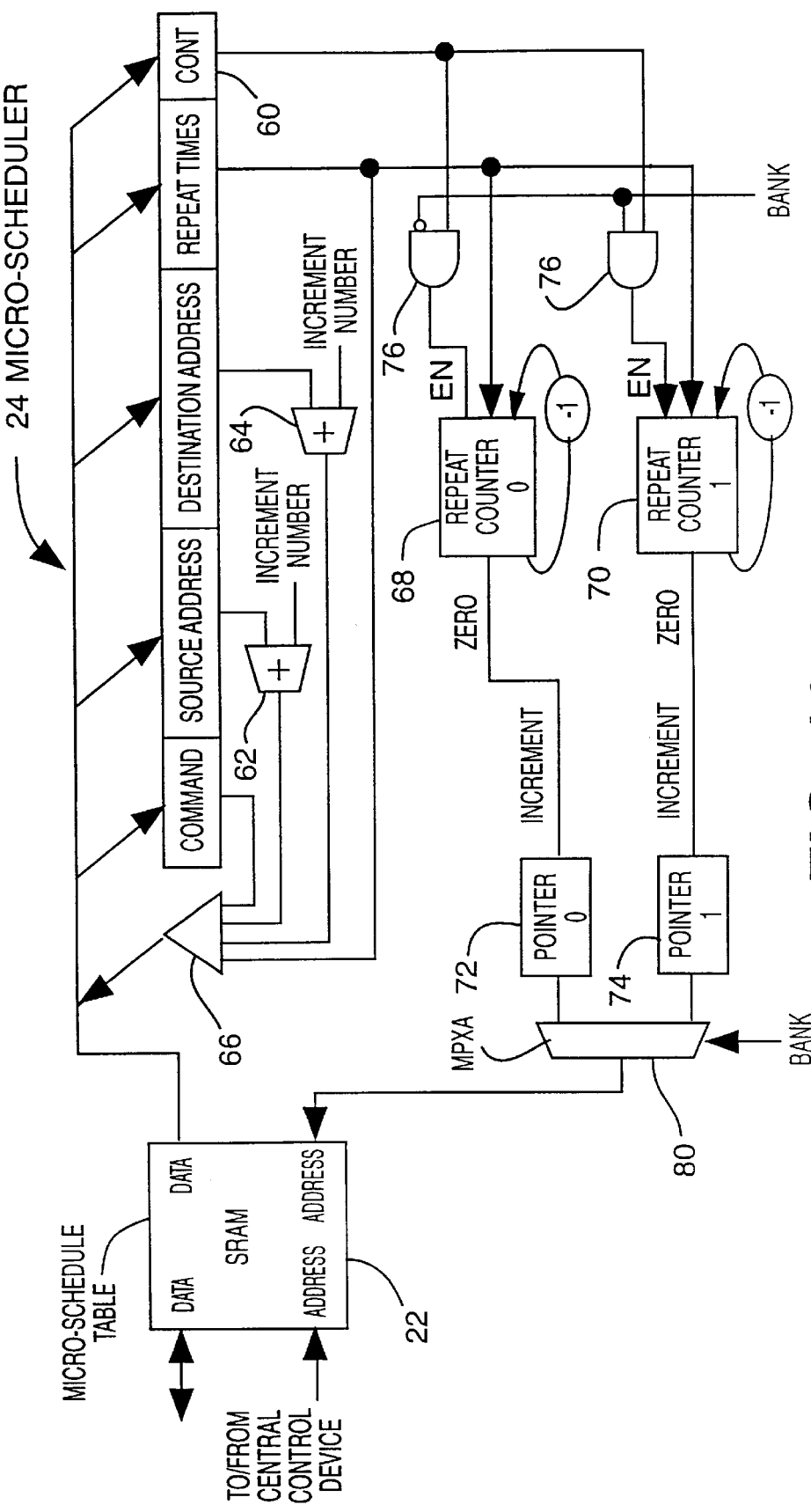
FIG. 13 shows an exemplary internal configuration of the micro-scheduler and the micro-schedule table.

In FIG. 13, SRAM 22 is of dual port structure, so that an arbitrary access can be performed by both central control device 20 and micro-scheduler 24. Instead of making SRAM 22 of dual port, it could have a double buffer structure. In this case, while central control device 20 is writing to one bank, micro-scheduler 22 is reading from the other bank.

By utilizing the "repeat times" in micro-schedule table 22, it is possible to handle videos of different data rates in the video server device. For example, suppose the data transfer rate of bus 18 is 1056 Mbit/sec, i.e., 33 MHZ with a width of 32 bits, and the number of entries in micro-schedule table 22 is 4096, with the "repeat times"=1, the video data rate would be 1056 Mbit/4096=258 Kbit/sec. For sending at 4 Mbit/sec, the "repeat times" is set to 16. Thus, the video transfer rate can easily be set by setting the "repeat times."

Although there is a 258 Kbit quantization error in the transfer rate, since terminal 16 and ATM controller 30 have buffers, this quantization error can be kept within a fixed range by adjusting the "repeat times" for each slot.

Figure 14A:
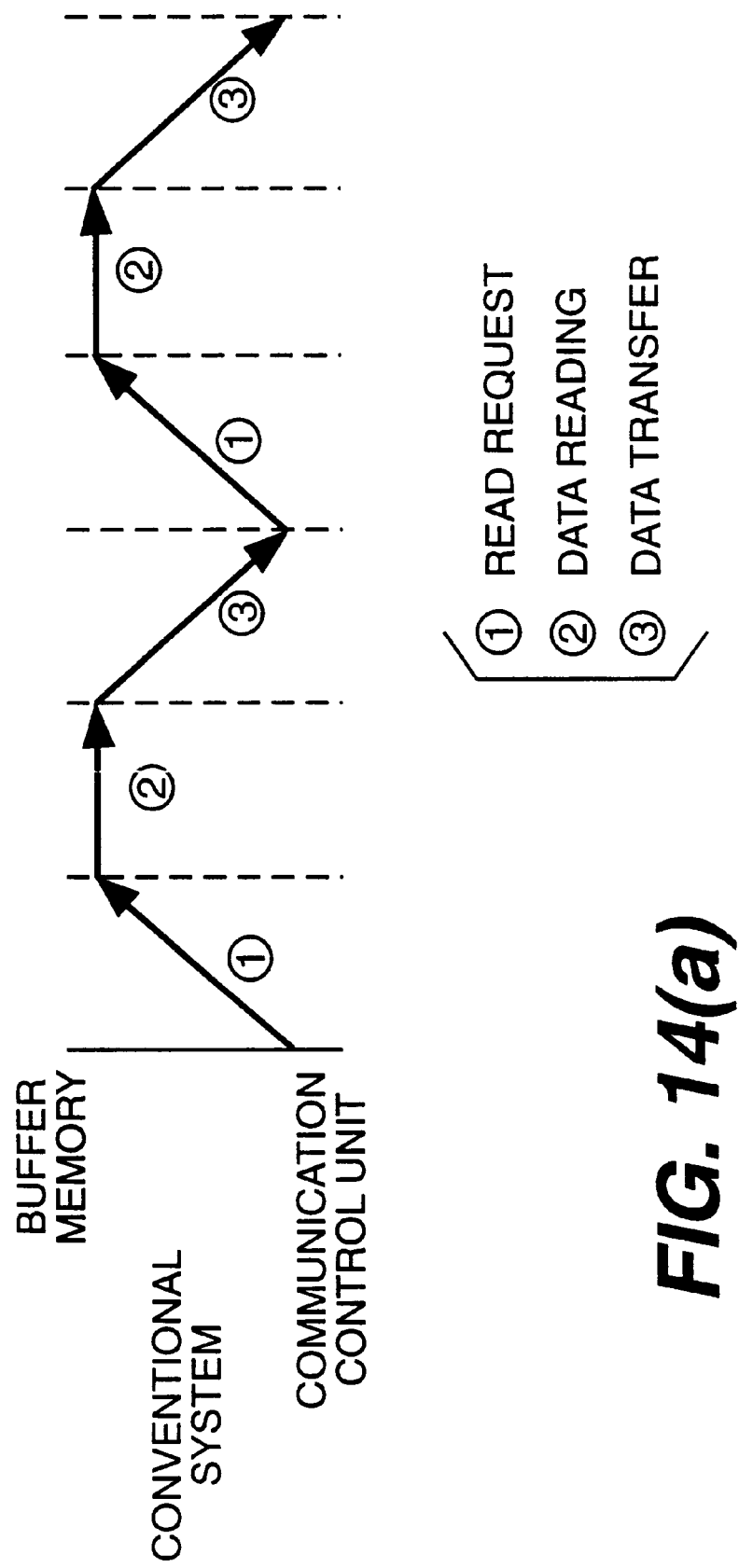
FIG. 14(a) is a timing diagram illustrating processing being conducted in series in a conventional system.
Figure 14B:
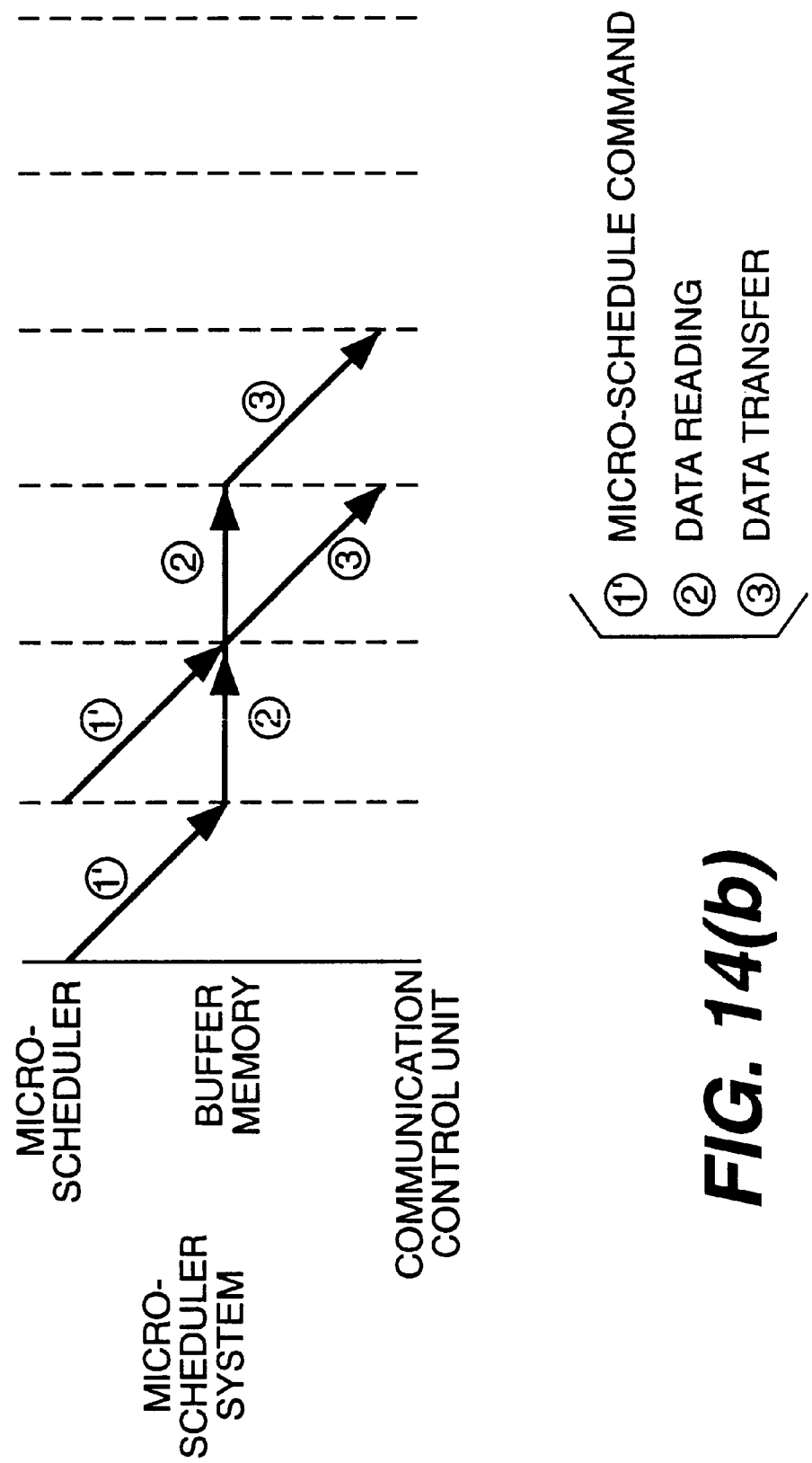
FIG. 14(b) is a timing diagram illustrating the effect of pipeline processing in the micro-scheduler system.

One of the benefits of using micro-scheduler 24 is efficient utilization of the bus due to highly-pipelined accesses. By using micro-scheduler 24, as shown in FIG. 14(b), the access time (latency of memory) for reading data from buffer memory 18 to communication control unit 12 can be concealed, and data can be transferred while data is being read.

With the conventional method, time is required for the arbitration of a plurality of requests and it is not possible to perform data transfer and data reading in parallel, so all processing is conducted in series. As seen in FIG. 14(a), the read request, data read and data transfer operations occur in series during a series of arbitrary time intervals.

In contrast, with the micro-scheduler system, the efficiency of bus use is very high since processing is performed in parallel. As seen in FIG. 14(b), micro-scheduler 24 issues a read request during each micro-slot while in each following micro-slot a data read operation occurs in response to the read request in the immediately preceding micro-slot. However, the next read request operation occurs in the same micro-slot as the data read corresponding to the immediately preceding read request. Further, a data transfer operation occurs during each micro-slot corresponding to the data read in the immediately preceding micro-slot. However, the next data read operation occurs in the same micro-slot as the data transfer corresponding to the immediately preceding read operation.

Figure 15:
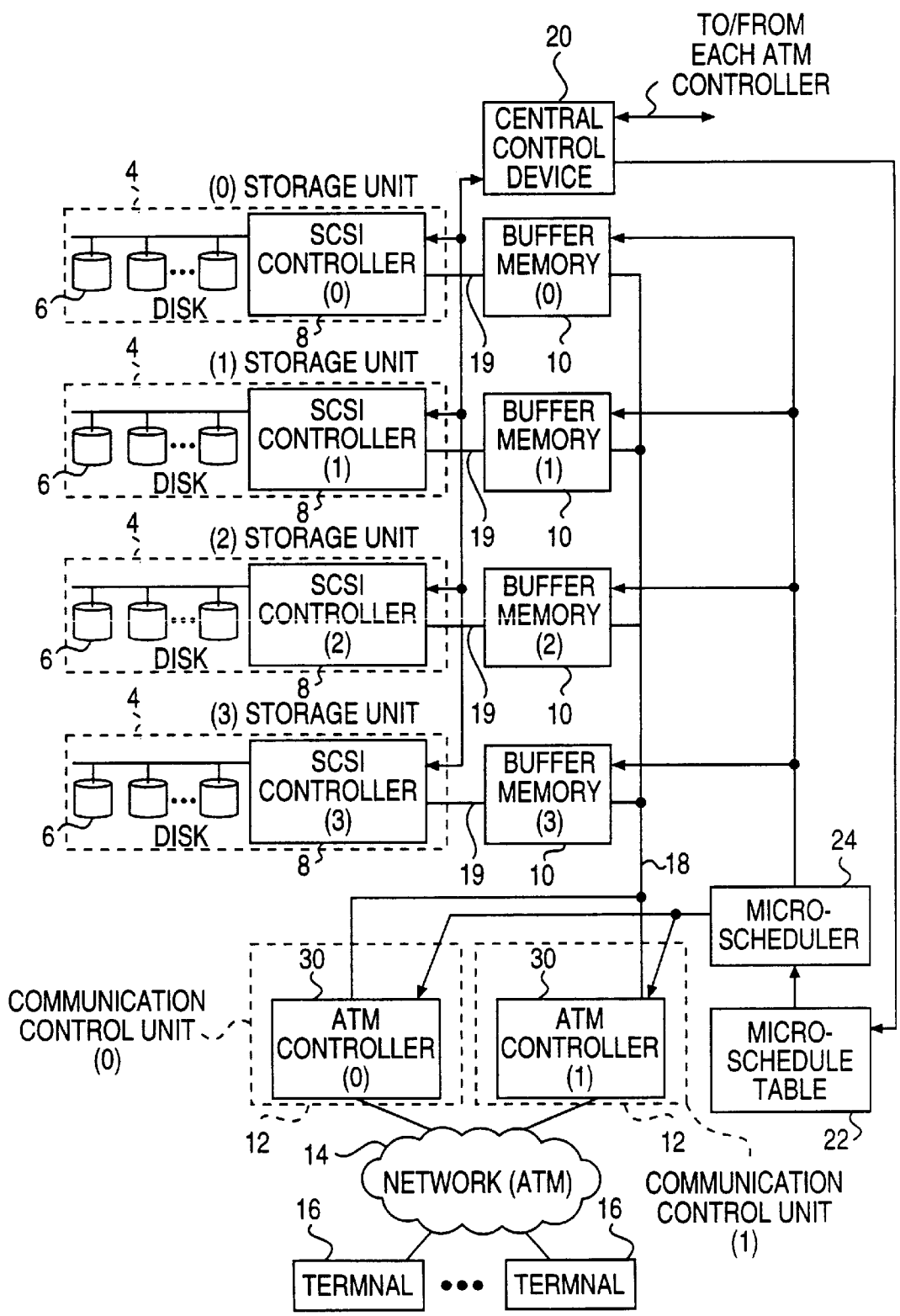
FIG. 15 is a block diagram of a second embodiment of a continuous data server apparatus according to the present invention.
Figure 16:
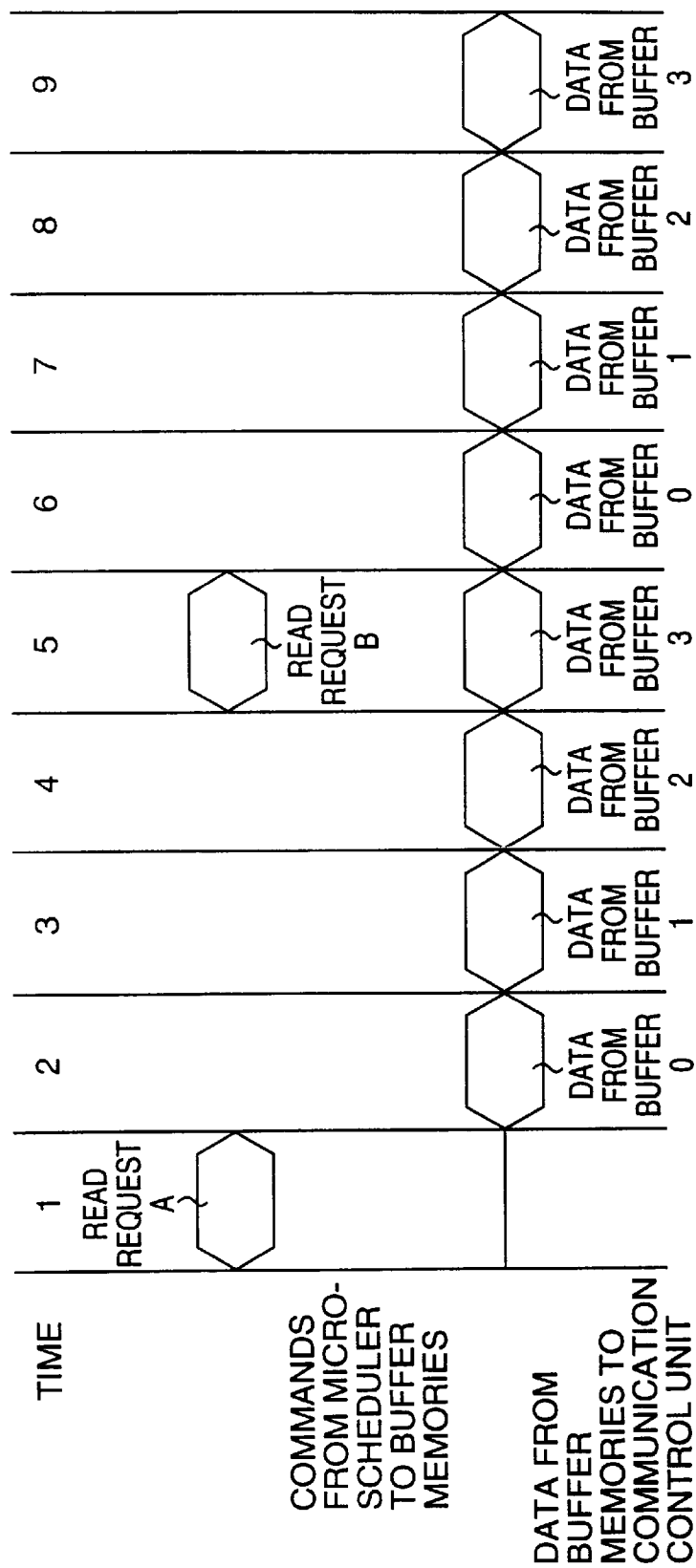
FIG. 16 shows the relationship between commands from the micro-scheduler to buffer memories and data from buffer memories to the communication control unit.

Referring now to FIG. 15 and FIG. 16, a second embodiment of the present invention will be described. FIG. 15 shows a configuration of a continuous data server apparatus according to the second embodiment.

The continuous data server apparatus shown in FIG. 15 comprises: a plurality of (in this case four) storage units 4 each of which includes a prescribed number of data storage devices 6 which store continuous data and data storage control device 8 which reads data out of or writes data into data storage devices 6; a plurality of buffer memories 10 provided with respective storage units 4, each buffer memory 10 for temporarily storing data read from or to be written to corresponding storage unit 4; one or more (in this case two) communication control units 12 which transfer the data of buffer memory 10 to network 14 addressed to each user terminal 16 or transfer data to buffer memory 10; bus 18 which connects buffer memories 10 and communication control units 12; and buses 19 which connect storage units 4 to their corresponding buffer memories 10.

The continuous data server apparatus further comprises: central control device 20 which controls the entire system, in particular, setting up the network and scheduling the reading of data from data memory devices 6 and the sending of data to network 14 in response to requests from terminals 16; micro-schedule table 22 which stores a micro-scheduling program determined by central control device 20; and a micro-scheduler 24 which deterministically assigns the right to use bus 18 to one of buffer memories 10 and communication control units 12 in accordance with the program stored in micro-schedule table 22.

Thus, in this embodiment, a plurality of (four in the case of FIG. 15) buffer memories 10, each buffer memory being provided for dedicated operation with its corresponding storage unit, are connected through bus 18 to the ATM controllers 30 of communication control units 12.

In a case, as in this embodiment, in which there are provided a plurality of storage units 4, the data can be striped onto disk devices 6 over the plurality of storage units 4. Then, by reading the disks in parallel, the bandwidth for disk access can be increased, enabling continuous data to be served to more users at the same time. Also, a RAID system can be used by allocating some of the plurality of storage units 4 as parity disks which store error correction codes.

FIG. 16 shows the relationship between commands from the micro-scheduler 24 to buffer memories 10 and the data sent to communication control unit 12 from buffer memories 10, when data is sent from each buffer memory 10 to one of communication control units 12. In FIG. 16, time periods 1–9 are micro-slots. When a read request A is issued to each buffer memory 10 from micro-scheduler 24 in time period 1, the requested data are sequentially read from the four buffer memories 10 such that: in time period 6, data are output from buffer memory (0); in time period 7, data are output from buffer memory (1); in time period 8, data are output from buffer memory (2); and in time period 9, data are output from buffer memory (3). In this way, the response to the read request A in time period 1 starts from time period 6 (the response to a precedent read request is performed during time periods 2 to 5), and thus the memory latency is masked by this pipelining action. This is further illustrated by initiating the next read request B during the output of data in time period 3 in response to the read request preceding read request A.

It is noted, as described in the first embodiment, that the commands can be given to each communication control unit 12 and each buffer memory 10 by sharing the bus 18, though dedicated control buses are provided from micro-scheduler 24 to buffer memories 10 and ATM controllers 30 in FIG. 15.

Referring now to FIG. 17 to FIG. 20, a third embodiment of the present invention will be described.

In the first and second embodiments, bus 18 between ATM controllers 30 and buffer memory (memories) 10 is controlled by micro-scheduler 24. It would also be possible to control bus 19 between SCSI controller 8 and buffer memory 10 by means of micro-scheduler 24.

Figure 17:
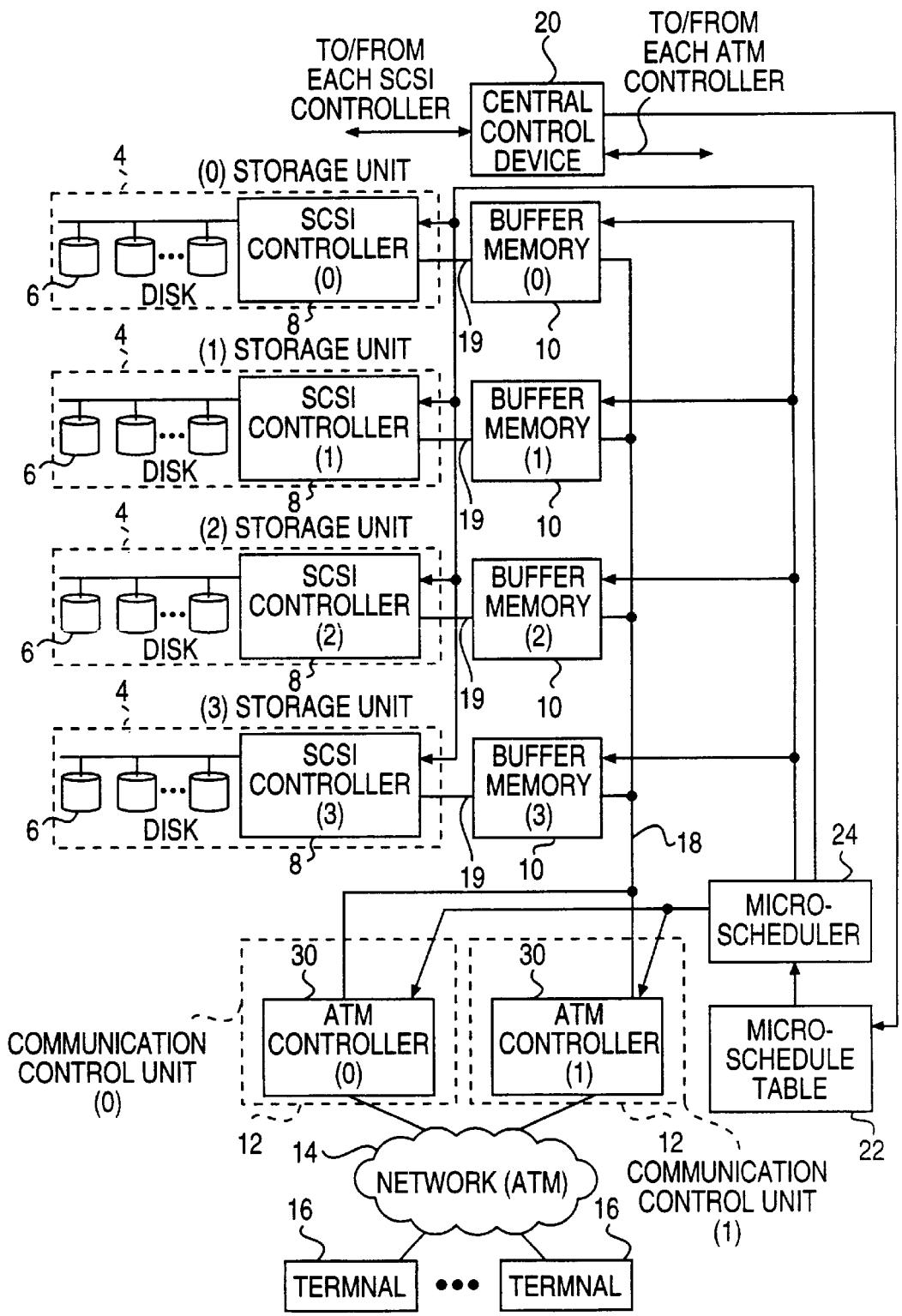
FIG. 17 is a block diagram of a third embodiment of a continuous data server apparatus according to the present invention.

FIG. 17 shows a configuration of a continuous data server apparatus according to the third embodiment.

The continuous server device of this embodiment is basically of the same configuration as the second embodiment, but differs in that micro-scheduler 24 controls bus use with respect to both storage and network, and in that the micro-scheduling program to be stored in micro-schedule table 22 is constructed for both the storage and for the network.

It is also possible to modify the first embodiment such that micro-scheduler 24 controls use of both bus 18 and bus 19, respectively.

Although two control buses are respectively dedicated to buffer memories 10 and to SCSI controllers 8 from micro-scheduler 24 in FIG. 17, one control bus can be shared by buffer memories 10 and SCSI controllers 8.

In a case, as in this embodiment, where both the storage and the network are controlled by micro-scheduler 24, the following two configurations of micro-scheduler 24 and micro-schedule table 22 may be considered.

Figure 18:
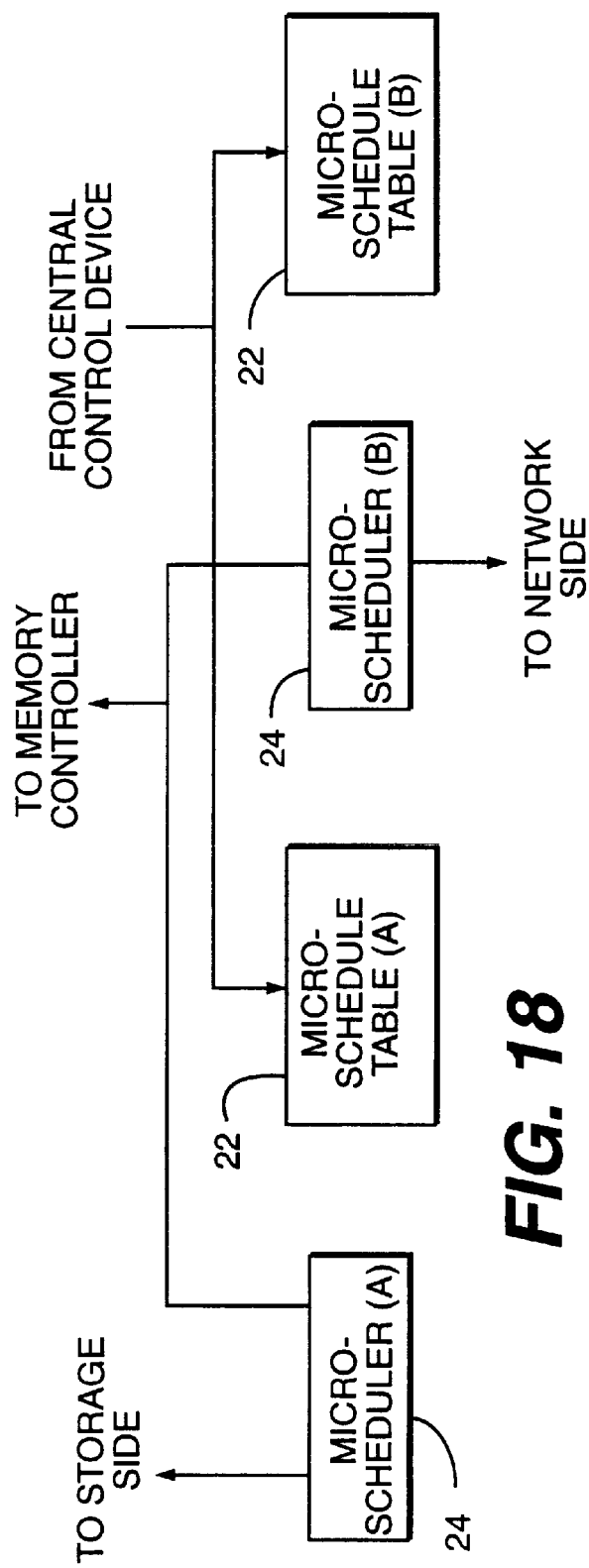
FIG. 18 is a diagram showing an example of a configuration of the micro-scheduler and micro-schedule table.

(1) As shown in FIG. 18, the micro-scheduler (A) 24 and micro-schedule table (A) 22 which control the storage are independent of micro-scheduler (B) 24 and micro-schedule table (B) 22 which control the network.

Figure 19:
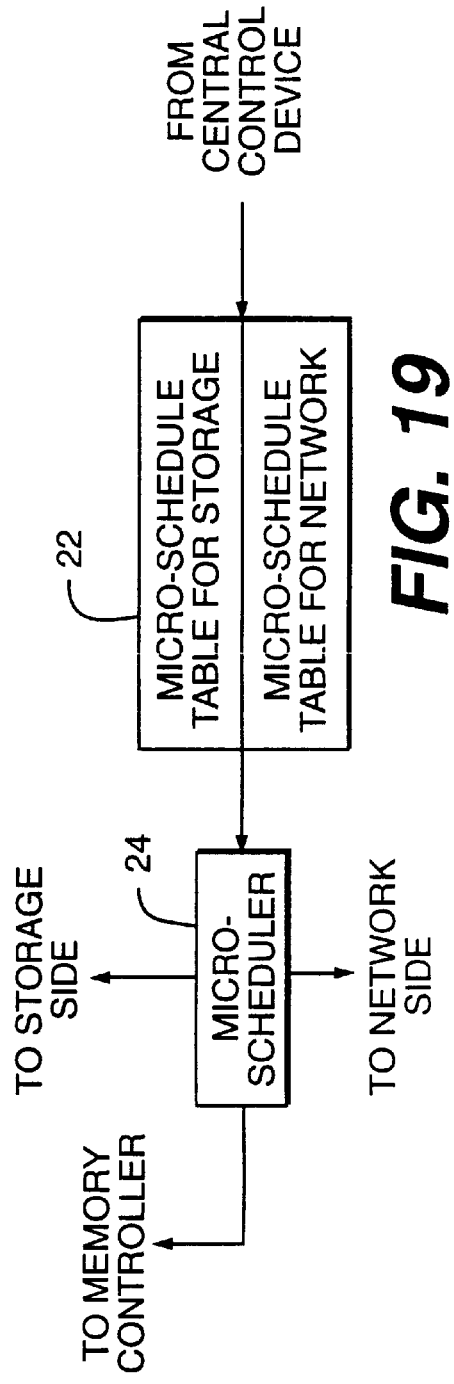
FIG. 19 is a diagram showing another alternative example of a configuration of the micro-scheduler and micro-schedule table.

(2) As shown in FIG. 19, common micro-scheduler 24 controls both the storage and the network, while micro-schedule table 22 is divided into a portion for controlling the storage and a portion for controlling the network.

Figure 20:
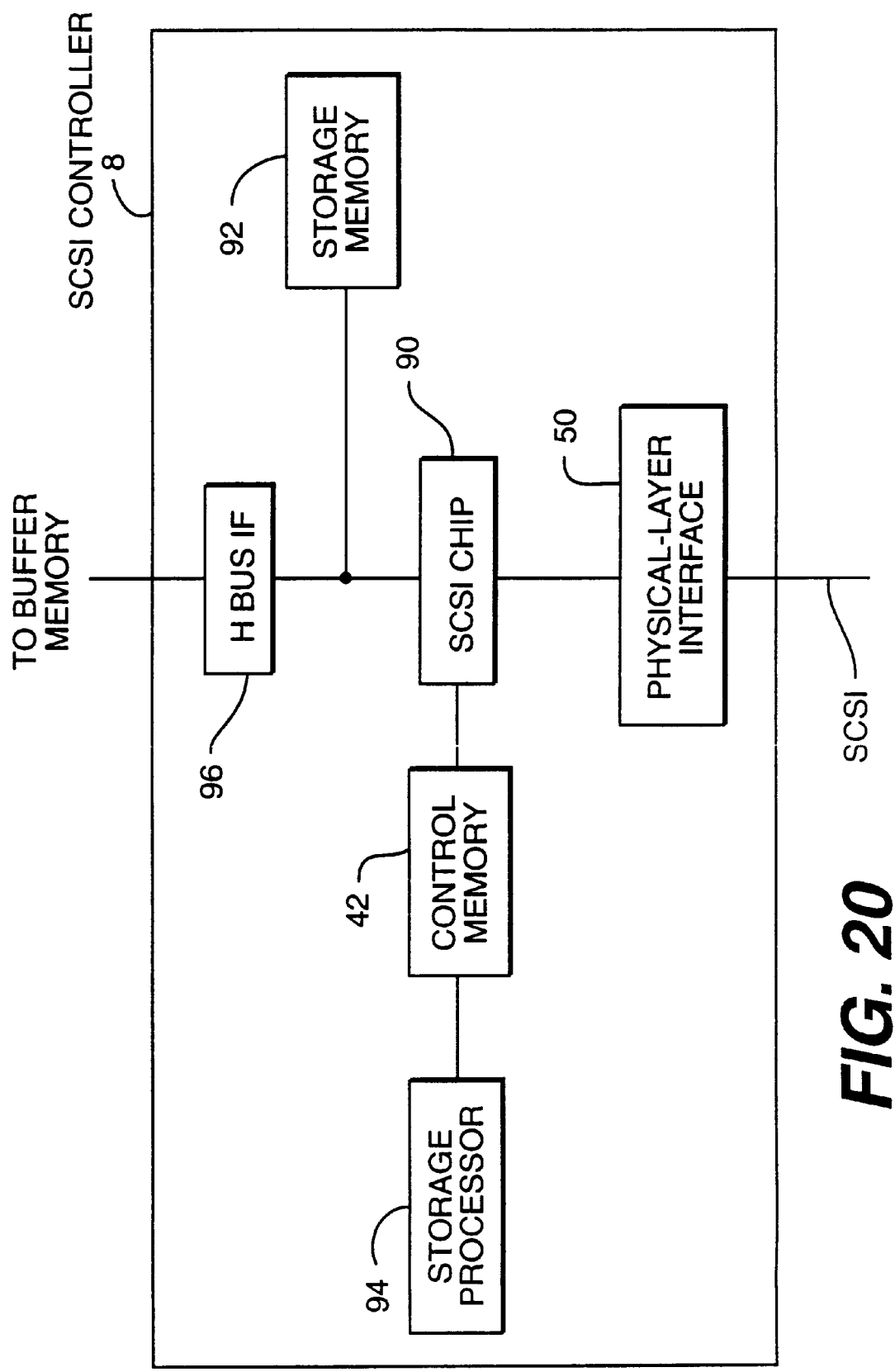
FIG. 20 shows an exemplary internal configuration of the data storage control device.

FIG. 20 shows an exemplary internal configuration of SCSI controller 8. SARCHIP 48 in the internal configuration of ATM controller 30 in communication control unit 12 (shown in FIG. 4) is replaced by SCSI-CHIP 90, packet memory 44 is replaced by storage memory 92, and the outside ATM network is replaced by SCSI. Also, network processor 40 is replaced by a storage processor 94, and VBUSIF 46 is replaced by a bus interface unit HBUSIF 96.

In this embodiment, although the network-side portion is the same as in the first or second embodiment, the storage-side portion is different. A In this embodiment, although the network-side portion is the same as in the first or second embodiment, the storage-side portion is different. A micro-schedule program is constructed assigning the right to use the bus between SCSI controller 8 and buffer memory 10. The right to use is assigned to buffer memory 10 for transferring data from buffer memory 10 to SCSI controller 8.

Alternatively, the right to use is assigned to SCSI controller 8 when SCSI controller 8 uses the bus for transferring data read from one of data storage devices 6 to buffer memory 10. Since the right to use the bus is assigned deterministically, and since the reading of data from data storage devices 6 may proceed intermittently, there may be intervals during the period that SCSI controller 8 has the right to use the bus when there is no data to transfer.

First, the data read from disk device 6 is accumulated in storage memory 92 of SCSI controller 8. The capacity of the storage memory 92 of SCSI controller 8 is equal to or larger than the amount of data to be accessed in the connected disk devices 6 in one slot. For example, if SCSI controller 8 issues a read command in one slot in respect of four disk devices 6 each of which is accessed at 64 KByte per one slot, the capacity of storage memory 92 should be 256 KByte or more. In the case of using a double buffer, the capacity of storage memory 92 should be at least 512 KBytes.

Hereinafter, a case in which a double buffer, which is easy to implement, is used as storage memory 92 will be described.

Data written into storage memory 92 in a particular slot is transferred to buffer memory 10 in the next slot. Since a double buffer is employed, while one bank is transferring data to buffer memory 10, the other bank is transferring data to storage memory 92 from disk device 6. Transfer between storage memory 92 and buffer memory 10 is at a fixed rate, and the use rate of the bus can be increased toward 100%. In this case, storage memory 92 functions to buffer data, which do not arrive from disk devices 6 at the fixed rate.

In contrast, when uploading contents as described above, the bus acts in the opposite direction. Specifically, data are transferred from buffer memory 10 to storage memory 92 in accordance with instructions from micro-scheduler 24, and then the data are transferred from storage memory 92 to disk device 6. In this case also, storage memory 92 acts as a buffer.

It should be noted that, in this embodiment, an arrangement is also possible in which micro-scheduler 24 controls bus use only for the storage-side. In this case, in the above configuration, means for transmitting information from micro-scheduler 24 to communication control unit 12 is unnecessary and micro-scheduler 24 and micro-schedule table 22 are provided corresponding to the storage-side, central control device 20 being modified to perform only micro-scheduling for the storage-side. The configuration and operation in the storage-side portion are the same as described above, while those in the network-side portion are conventional, i.e., the right to use the bus is controlled by an arbitration device.

Though the disks are connected by a SCSI controller in the above embodiments, it would be possible to employ other disk interfaces, e.g., a fibre channel. Also, although ATM is employed in the network, another network such as Ethernet can be used. Moreover, while a system having only one micro-scheduler has been disclosed, it would be possible to provide a plurality of micro-schedulers, such as for respective buffer memories.

In addition to those already mentioned above, persons of ordinary skill will realize that many modifications and variations of the above embodiments may be made without departing from the novel and advantageous features of the present invention. Accordingly, all such modifications and variations are intended to be included within the scope of the appended claims.

The specification and examples are only exemplary. The following claims define the true scope and spirit of the invention.

What is claimed is:

1. A computer apparatus, comprising:

a bus;

a plurality of units connected to the bus, each one of the plurality of units being for performing a function by using the bus according to a right assigned to said each one of the plurality of units;

a memory for storing a program generated in response to an external user request, the program including an indication of when each one of the plurality of units is to use the bus; and a scheduler for assigning the right to use the bus deterministically to each one of the plurality of units, while instructing said each one of the plurality of units to perform the function so as to respond the user request, in accordance with the program stored in the memory.

2. The computer apparatus according to claim 1, further comprising a central control device for generating the program and writing the generated program into the memory.

3. The computer apparatus according to claim 2, wherein the memory includes:

a plurality of banks; and means for executing writing into one of the banks from the central control device while concurrently reading out of another one of the banks to the scheduler.

4. The computer apparatus according to claim 1, wherein the assigning means includes means for transferring an operation mode and an address to each one of the plurality of units in accordance with the program stored in the memory; and wherein each one of the plurality of units includes means for using the bus in accordance with the operation mode and the address.

5. The computer apparatus according to claim 4, further comprising a control bus for connecting the plurality of units and the scheduler; and wherein the transferring means includes means for transferring the operation mode and the address via the control bus.

6. The computer apparatus according to claim 4, wherein the transferring means includes means for transferring the operation mode and the address via the bus.

7. The computer apparatus according to claim 1, wherein the memory includes means for storing, as the program, a plurality of entries each including a source address, a destination address, and a repetition number; and wherein the scheduler includes means for repeating a number of times equal to the repetition number an action including transferring an instruction to at least one of the plurality of units based on the source and destination addresses and incrementing the source and destination addresses.

8. The computer apparatus according to claim 7, wherein the scheduler includes means for stopping the incrementing of the source and destination addresses and for instructing at least one of the plurality of units to which a write instruction has been transferred not to execute the write instruction, when there is no data corresponding to the write instruction.

9. The computer apparatus according to claim 1, wherein the memory includes a plurality of banks for storing respective programs, each program being used for instructing a corresponding unit of the plurality of units.

10. The computer apparatus according to claim 9, wherein the scheduler includes means for assigning the right to use the bus such that the respective uses of the bus for transferring data to at least two units of the plurality of units are interleaved.

11. A continuous data server apparatus for transferring continuous data stored in a storage unit, the apparatus comprising:

a bus;

a buffer memory unit, connected to the bus, for temporarily storing desired continuous data read out of the storage unit and for outputting the desired continuous data onto the bus according to a right assigned to the buffer memory unit;

a plurality of communication control units connected to the bus, at least one of the plurality of communication control units being for inputting the desired continuous data outputted onto the bus and for transferring the desired continuous data inputted by said at least one of the plurality of communication control units to a communication path;

a memory for storing a program; and a scheduler for assigning the right to use the bus to the buffer memory unit, while instructing the buffer memory unit to output the desired continuous data onto the bus and instructing said at least one of the plurality of communication control units to input the desired continuous data, in accordance with the program stored in the memory.

12. The continuous data server apparatus according to claim 11, further comprising:

a central control device for generating the program to control transfer of the desired continuous data from the buffer memory unit to at least one of the plurality of communication control units at regular intervals, and for writing the generated program into the memory.

13. The continuous data server apparatus according to claim 11, further comprising a central control device including:

means for scheduling a transfer of the desired continuous data from the buffer memory unit to the communication path through at least one of the plurality of communication control units, in units of slots, each slot being uniformly divided into mini-slots; and means for generating the program and for writing the generated program into the memory such that the right to use the bus is assigned to the buffer memory unit for transferring the desired continuous data for each user to a corresponding one of the plurality of communication control units at a fixed position in each mini-slot.

14. The continuous data server apparatus according to claim 13, wherein the generating means includes means for generating the program corresponding to the mini-slot, and the scheduler includes means for repeating using the program as many times as the number of mini-slots in one slot.

15. The continuous data server apparatus according to claim 11, further comprising a central control device including:

means for scheduling a transfer of the desired continuous data from the buffer memory unit to the communication path through at least one of the plurality of communication control units, in units of slots, each slot being uniformly divided into micro-slots; and means for generating the program and for writing the generated program into the memory such that the right to use the bus is assigned to the buffer memory unit for transferring the desired continuous data at a predetermined bit rate for each user to a corresponding one of the plurality of communication control units during the micro-slots, the number of micro-slots being proportional to the predetermined bit rate.

16. The continuous data server apparatus according to claim 15, wherein the memory includes means for storing, as the program, a plurality of entries each including a buffer memory unit address, a communication control unit address, and a repetition number corresponding to the number of micro-slots; and wherein the scheduler includes means for repeating a number of times equal to the repetition number, an action including transferring an instruction to the buffer memory unit and to at least one of the plurality of communication control units, based on the buffer memory unit and communication control unit addresses.

17. The continuous data server apparatus according to claim 11, wherein the memory includes a plurality of banks for storing a plurality of programs, each program for instructing a corresponding one of the plurality of communication control units.

18. The continuous data server apparatus according to claim 17, wherein the scheduler includes means for assigning the right to use the bus such that the respective uses of the bus by the buffer memory unit for transferring the desired continuous data to the communication control units are interleaved.

19. A continuous data server apparatus for transferring continuous data to and from a storage unit, the apparatus comprising:

a bus;

a storage control unit, connected to the bus, for reading out first continuous data from the storage unit, and outputting the first continuous data onto the bus according to a right assigned to the storage control unit, and for inputting second continuous data from the bus and writing the second continuous data into the storage unit;

a buffer memory unit, connected to the bus, for temporarily storing the first continuous data outputted onto the bus and the second continuous data, and for outputting the second continuous data onto the bus according to a right assigned to the buffer memory unit;

a communication control unit for transferring the first continuous data stored in the buffer memory unit to a communication path and for receiving the second continuous data to be stored into the buffer memory unit;

a memory for storing a program; and a scheduler for assigning to each of the storage control unit and the buffer memory unit the right to use the bus, while instructing said each of the storage control unit and the buffer memory unit to output data onto the bus, in accordance with the program stored in the memory.

20. The continuous data server apparatus of claim 19, further including:

another bus for connecting the buffer memory unit and the communication control unit; and wherein the means for assigning includes means for assigning a right to use said another bus deterministically to each of the communication control unit and the buffer memory unit in accordance with the program stored in the memory.

21. The continuous data server apparatus of claim 19, wherein the assigning means is a first assigning means and the memory is a first memory;

the continuous data server apparatus further including:

another bus for connecting the buffer memory unit and the communication control unit;

a second memory for storing another program; and second means for assigning a right to use said another bus deterministically to each of the communication control unit and the buffer memory unit in accordance with said another program stored in the second memory.

22. A continuous data server apparatus for uploading continuous data to a storage unit, the apparatus comprising:

a bus;

a plurality of communication control units, connected to the bus, for transferring continuous data uploaded from outside of the apparatus onto the bus according to a right assigned to at least one of the plurality of communication control units;

a buffer memory unit, connected to the bus, for temporarily storing the continuous data transferred by said at least one of the plurality of communication control units;

a storage control unit for writing the continuous data temporarily stored in the buffer memory unit into the storage unit;

a memory for storing a program; and a scheduler for assigning the right to use the bus to said at least one of the communication control units, while instructing said at least one of the communication control units to output the continuous data onto the bus and instructing the buffer memory unit to input the continuous data, in accordance with the program stored in the memory.

23. The continuous data server apparatus according to claim 22, wherein the memory includes means for storing, as the program, a plurality of entries each including a buffer memory unit address, a communication control unit address, and a repetition number;

wherein the assigning means includes:

means for repeating a number of times equal to the repetition number, an action including transferring an instruction to the buffer memory unit and to one of the plurality of communication control units, based on the buffer memory unit and communication control unit addresses and for incrementing those addresses; and means for stopping the incrementing of the buffer memory unit and communication control unit addresses and for instructing the buffer memory unit to which a write instruction has been transferred not to execute the write instruction, when there is no data corresponding to the write instruction.

24. A continuous data server apparatus for transferring continuous data stored in a plurality of storage units, the apparatus comprising:

a bus;

a plurality of buffer memory units, connected to the bus, for temporarily storing desired continuous data read out of corresponding ones of the storage units and outputting the desired continuous data onto the bus according to a right assigned to one of the plurality of buffer memory units;

a communication control unit, connected to the bus, for transferring the desired continuous data outputted onto the bus to a a memory for storing a program; and a scheduler for assigning the right to use the bus to said one of the buffer memory units, while instructing said one of the buffer memory units to output the desired continuous data onto the bus and instructing the communication control unit to input the desired continuous data, in accordance with the program stored in the memory.

25. A continuous data server apparatus for transferring continuous data to and from a storage unit, the apparatus comprising:

a bus;

a buffer memory unit, connected to the bus, for temporarily storing first continuous data read out from the storage unit and second continuous data to be written into the storage unit, and for outputting the first continuous data onto the bus according to a right assigned to the buffer memory unit;

a communication control unit, connected to the bus, for transferring the first continuous data outputted onto the bus to a communication path, and for receiving the second continuous data to be stored into the buffer memory unit and outputting the second continuous data onto the bus according to a right assigned to the communication control unit;

a memory for storing a program; and a scheduler for assigning to each of the buffer memory unit and the communication control unit the right to use the bus, while instructing said each of the buffer memory unit and the communication control unit to output data onto the bus, in accordance with the program stored in the memory.

26. Data processing apparatus, comprising:

a bus;

a plurality of units connected to the bus, each of the units having a need to use the bus for performing a function;

a memory for storing a schedule indicating when said each of the units is to use the bus; and means for generating the schedule to be stored in the memory responsive to an external user request, and for assigning a right to use the bus to each of the units, while instructing said each of the units to perform the function so as to respond to the user request in accordance with the schedule stored in memory.

27. A bus controlling method in a computer having a plurality of units and a bus connecting the plurality of units, comprising the steps of:

storing, responsive to an external user request, a schedule indicating when said each of the units is to use the bus into a memory;

assigning a right to use the bus to each one of the plurality of units in accordance with the schedule stored in the memory; and performing, by said each one of the units, a function through using the bus in accordance with the assigned right to use so as to respond to the user request.

* * * * *